(12) United States Patent
Feiz et al.

(10) Patent No.: US 12,467,630 B2
(45) Date of Patent: Nov. 11, 2025

(54) FUEL INJECTION ASSEMBLY HAVING A BOSS WITH A SERPENTINE COOLING PASSAGE

(71) Applicant: GE Infrastructure Technology LLC, Greenville, SC (US)

(72) Inventors: Homayoon Feiz, Greenville, SC (US); Michael John Hughes, State College, PA (US); Jonathan Dwight Berry, Simpsonville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/348,749

(22) Filed: Jul. 7, 2023

(65) Prior Publication Data
US 2025/0012444 A1   Jan. 9, 2025

(51) Int. Cl.
| | | |
|---|---|---|
| *F23R 3/28* | (2006.01) | |
| *F02C 7/22* | (2006.01) | |
| *F23R 3/34* | (2006.01) | |

(52) U.S. Cl.
CPC .............. *F23R 3/28* (2013.01); *F02C 7/22* (2013.01); *F23R 3/286* (2013.01); *F23R 3/346* (2013.01)

(58) Field of Classification Search
CPC .......... F02C 7/22; F05D 2240/35; F23R 3/28; F23R 3/286; F23R 3/34; F23R 3/346
See application file for complete search history.

(56) References Cited

U.S. PATENT DOCUMENTS

| | | |
|---|---|---|
| 4,903,480 A | 2/1990 | Lee et al. |
| 5,220,787 A | 6/1993 | Bulman |
| 5,640,851 A | 6/1997 | Toon et al. |
| 6,868,676 B1 | 3/2005 | Haynes |
| 6,915,636 B2 | 7/2005 | Stuttaford et al. |
| 7,878,000 B2 | 2/2011 | Mancini et al. |
| 8,113,001 B2 | 2/2012 | Singh et al. |
| 8,171,735 B2 | 5/2012 | Mancini et al. |
| 8,387,391 B2 | 3/2013 | Patel et al. |
| 8,387,398 B2 | 3/2013 | Martin et al. |
| 8,407,892 B2 | 4/2013 | DiCintio et al. |
| 8,438,856 B2 | 5/2013 | Chila et al. |
| 8,590,311 B2 | 11/2013 | Parsania et al. |
| 8,745,987 B2 | 6/2014 | Stoia et al. |
| 8,863,525 B2 | 10/2014 | Toronto et al. |

(Continued)

FOREIGN PATENT DOCUMENTS

| | | |
|---|---|---|
| EP | 1431543 A2 | 6/2004 |
| EP | 2208934 A1 | 7/2010 |

(Continued)

*Primary Examiner* — Gerald L Sung
*Assistant Examiner* — Henry Ng
(74) *Attorney, Agent, or Firm* — Dority & Manning, P.A.

(57) ABSTRACT

Fuel injection assemblies and combustors are provided. The fuel injection assembly includes a fuel injector that is configured to couple to an outer sleeve of the combustor. The fuel injection assembly further comprises a boss that is spaced apart from the fuel injector and is configured to couple to a combustion liner of the combustor. The boss includes a flange portion, an annular wall portion extending from the flange portion, and an interior surface. The boss defines a serpentine cooling passage that extends from an inlet on the flange portion to an outlet on the interior surface.

15 Claims, 11 Drawing Sheets

(56) References Cited

U.S. PATENT DOCUMENTS

| | | |
|---|---|---|
| 8,943,831 B2 | 2/2015 | Eroglu et al. |
| 9,200,808 B2 | 12/2015 | Roming et al. |
| 9,212,609 B2 | 12/2015 | Twardochleb et al. |
| 9,267,436 B2 | 2/2016 | Stoia et al. |
| 9,291,350 B2 | 3/2016 | Melton et al. |
| 9,303,872 B2 | 4/2016 | Hadley et al. |
| 9,310,078 B2 | 4/2016 | Chen et al. |
| 9,316,155 B2 | 4/2016 | DiCintio et al. |
| 9,316,396 B2 | 4/2016 | DiCintio et al. |
| 9,322,556 B2 | 4/2016 | Melton et al. |
| 9,360,217 B2 | 6/2016 | DiCintio et al. |
| 9,376,961 B2 | 6/2016 | Stoia et al. |
| 9,383,104 B2 | 7/2016 | Melton et al. |
| 9,400,114 B2 | 7/2016 | Melton et al. |
| 9,494,321 B2 * | 11/2016 | Melton .................. F23R 3/08 |
| 9,945,250 B2 * | 4/2018 | Kitamura ............... F01D 11/24 |
| 10,443,500 B2 * | 10/2019 | Maurer ................ F23M 5/085 |
| 10,513,987 B2 | 12/2019 | Hughes et al. |
| 10,690,349 B2 | 6/2020 | Natarajan et al. |
| 10,865,992 B2 * | 12/2020 | DiCintio ................ F23R 3/002 |
| 11,067,281 B1 * | 7/2021 | Garcia .................. F23R 3/283 |
| 11,248,794 B2 | 2/2022 | Berry |
| 11,287,134 B2 | 3/2022 | Berry |
| 11,566,790 B1 * | 1/2023 | Hughes ................. F23R 3/346 |
| 2010/0077760 A1 | 4/2010 | Laster et al. |
| 2011/0289928 A1 | 12/2011 | Fox et al. |
| 2012/0272659 A1 | 11/2012 | Syed et al. |
| 2013/0174558 A1 | 7/2013 | Stryapunin |
| 2014/0097276 A1 | 4/2014 | Boardman et al. |
| 2014/0190170 A1 | 7/2014 | Cai et al. |
| 2014/0260280 A1 | 9/2014 | Willis et al. |
| 2014/0260318 A1 | 9/2014 | Willis et al. |
| 2014/0360193 A1 | 12/2014 | Stoia et al. |
| 2015/0285501 A1 * | 10/2015 | DiCintio ................ F23R 3/346 60/740 |
| 2016/0047317 A1 | 2/2016 | Willis et al. |
| 2017/0167728 A1 * | 6/2017 | Gonyou ................. F23R 3/002 |
| 2017/0176015 A1 * | 6/2017 | Kapilavai .............. F02C 7/222 |
| 2017/0268786 A1 * | 9/2017 | Cai ........................ F23R 3/283 |
| 2018/0119958 A1 * | 5/2018 | Hoffman ................ F23R 3/60 |
| 2018/0209651 A1 * | 7/2018 | Cai ........................ F23R 3/346 |
| 2018/0328587 A1 * | 11/2018 | Gubba ................... F23R 3/346 |
| 2018/0328588 A1 * | 11/2018 | Lemon .................. F23R 3/36 |
| 2019/0063749 A1 * | 2/2019 | Zelesky ................. F02C 7/12 |
| 2019/0072279 A1 * | 3/2019 | Natarajan .............. F23R 3/002 |
| 2021/0099299 A1 | 4/2021 | Daniel |
| 2021/0199299 A1 | 7/2021 | Berry et al. |
| 2022/0099297 A1 * | 3/2022 | Garcia ................... F23R 3/286 |
| 2023/0135396 A1 * | 5/2023 | Kalb ...................... F23R 3/283 60/737 |

FOREIGN PATENT DOCUMENTS

| | | |
|---|---|---|
| EP | 3343108 A1 | 7/2018 |
| EP | 3346187 A2 | 7/2018 |

* cited by examiner

FUEL INJECTION ASSEMBLY HAVING A BOSS WITH A SERPENTINE COOLING PASSAGE

FIELD

The present disclosure relates generally to fuel injectors for gas turbine combustors and, more particularly, to fuel injectors for use with an axial fuel staging (AFS) system associated with such combustors.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In some combustors, the generation of combustion gases occurs at two, axially spaced stages. Such combustors are referred to herein as including an "axial fuel staging" (AFS) system, which delivers fuel and an oxidant to one or more fuel injectors downstream of the head end of the combustor. In a combustor with an AFS system, a primary fuel nozzle at an upstream end of the combustor injects fuel and air (or a fuel/air mixture) in an axial direction into a primary combustion zone, and an AFS fuel injector located at a position downstream of the primary fuel nozzle injects fuel and air (or a second fuel/air mixture) as a cross-flow into a secondary combustion zone downstream of the primary combustion zone. The cross-flow is generally transverse to the flow of combustion products from the primary combustion zone.

Traditional gas turbine engines include one or more combustors that burn a mixture of natural gas and air within the combustion chamber to generate the high pressure and temperature combustion gases. As a byproduct, oxides of nitrogen (NOx) and other pollutants are created and expelled by the exhaust section. Regulatory requirements for low emissions from gas turbines are continually growing more stringent, and environmental agencies throughout the world are now requiring even lower rates of emissions of NOx and other pollutants from both new and existing gas turbines.

Burning a mixture of natural gas and high amounts of hydrogen and/or burning pure hydrogen instead of natural gas within the combustor would significantly reduce or eliminate the emission of NOx and other pollutants. However, because hydrogen burning characteristics are different than those of natural gas, traditional combustion systems, including traditional AFS fuel injectors, are not capable of burning high levels of hydrogen and/or pure hydrogen without issue. For example, burning high levels of hydrogen and/or pure hydrogen within a traditional combustion system could promote flashback or flame holding conditions in which the combustion flame migrates towards the fuel being supplied by the injector, possibly causing severe damage to the injector in a relatively short amount of time.

As such, a fuel injection assembly capable of delivering alternative fuels (such as hydrogen) and air to a secondary combustion zone, without causing flame holding or flashback issues, is desired in the art.

BRIEF DESCRIPTION

Aspects and advantages of the fuel injection assemblies and combustors in accordance with the present disclosure will be set forth in part in the following description, or may be obvious from the description, or may be learned through practice of the technology.

In accordance with one embodiment, a fuel injection assembly for a combustor of a gas turbine is provided. The fuel injection assembly includes a fuel injector that is configured to couple to an outer sleeve of the combustor. The fuel injection assembly further comprises a boss that is spaced apart from the fuel injector and is configured to couple to a combustion liner of the combustor. The boss includes a flange portion, an annular wall portion extending from the flange portion, and an interior surface. The boss defines a serpentine cooling passage that extends from an inlet on the flange portion to an outlet on the interior surface.

In accordance with another embodiment, a combustor is provided. The combustor includes at least one fuel nozzle and a combustion liner that extends downstream from the fuel nozzle. The combustor further includes an outer sleeve that is spaced apart from and surrounds the combustion liner such that an annulus is defined therebetween. The combustor further includes a fuel injection assembly that is disposed downstream from the at least one fuel nozzle. The fuel injection assembly includes a fuel injector that is configured to couple to an outer sleeve of the combustor. The fuel injection assembly further comprises a boss that is spaced apart from the fuel injector and is configured to couple to a combustion liner of the combustor. The boss includes a flange portion, an annular wall portion extending from the flange portion, and an interior surface. The boss defines a serpentine cooling passage that extends from an inlet on the flange portion to an outlet on the interior surface.

In accordance with yet another embodiment, a fuel injection assembly for a combustor of a gas turbine is provided. The fuel injection assembly includes a fuel injector that is configured to couple to an outer sleeve of the combustor. The fuel injection assembly further includes a boss that is spaced apart from the fuel injector and is configured to couple to a combustion liner of the combustor. The boss includes a flange portion and an annular wall portion extending from the flange portion. The annular wall portion includes a first end segment, a second end segment, and side segments extending between the first end segment and the second end segment. The boss includes a first blocking flange extending from the first end segment and a second blocking flange extending from the second end segment.

In accordance with another embodiment, a fuel injection assembly for a combustor of a gas turbine is provided. The fuel injection assembly includes a boss that forms at least a portion of an annular wall. The annular wall defines a mixing channel that extends along a center axis. The fuel injection assembly further includes a fuel injector that has a radially outer wall and a radially inner wall that at least partially define a fuel plenum. The fuel injector further includes a plurality of premix tubes that each extend along an injection axis from an inlet end on the radially outer wall through the fuel plenum to an outlet end, and wherein the injection axis is slanted towards the center axis of the mixing channel.

In accordance with yet another embodiment, a combustor is provided. The combustor includes at least one fuel nozzle and a combustion liner that extends downstream from the fuel nozzle. The combustor further includes an outer sleeve that is spaced apart from and surrounds the combustion liner such that an annulus is defined therebetween. The combustor further includes a fuel injection assembly that is disposed downstream from the at least one fuel nozzle. The fuel injection assembly includes a boss that forms at least a portion of an annular wall. The annular wall defines a mixing channel that extends along a center axis. The fuel injection assembly further includes a fuel injector that has a radially outer wall and a radially inner wall that at least partially define a fuel plenum. The fuel injector further includes a plurality of premix tubes that each extend along an injection axis from an inlet end on the radially outer wall through the fuel plenum to an outlet end, and wherein the injection axis is slanted towards the center axis of the mixing channel.

These and other features, aspects and advantages of the present fuel injection assemblies and combustors will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present fuel injection assemblies and combustors, including the best mode of making and using the present systems and methods, directed to one of ordinary skill in the art, is set forth in the specification, which makes reference to the appended figures, in which.

DETAILED DESCRIPTION

Figure 1:
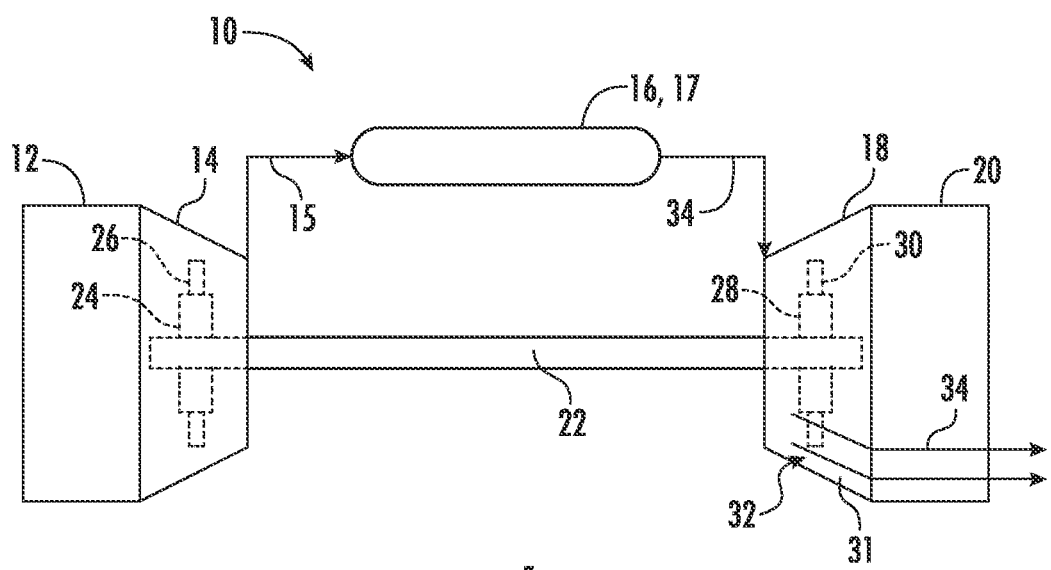
FIG. 1 is a schematic illustration of a turbomachine, in accordance with embodiments of the present disclosure.

Reference now will be made in detail to embodiments of the present fuel injection assemblies and combustors, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the subject technology. As used herein, the terms "first", "second", and "third" may be used interchangeably to distinguish one component from another and are not intended to signify location or importance of the individual components.

The term "fluid" may refer to a gas or a liquid. The term "fluid communication" means that a fluid is capable of flowing or being conveyed between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values, and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. The terms "directly coupled," "directly fixed," "directly attached to," and the like indicated that a first component is joined to a second component with no intervening structures. As used herein, the terms "comprises," "comprising." "includes," "including," "has," "having" or any other variations thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive selection and not to an exclusive selection. For example, a condition A or B is satisfied by any one of the following: A is true (or present) and B is false (or not present), and A is false (or not present) and B is true (or present).

Here and throughout the specification and claims, range limitations are identified and include all the sub-ranges contained therein unless context or language indicates otherwise. For example, all ranges disclosed herein are inclusive of the endpoints, and the endpoints are independently combinable with each other.

As used herein, the term "premix" may be used to describe a component, passage, or cavity upstream of a respective combustion zone within which mixing occurs. For example, "premix" may be used to describe a component, passage, or cavity in which two fluids (such as fuel and air) are mixed together prior to being ejected from such component, passage, or cavity (e.g., into a combustion zone).

Referring now to the drawings, FIG. 1 illustrates a schematic diagram of one embodiment of a turbomachine, which in the illustrated embodiment is a gas turbine engine 10. Although an industrial or land-based gas turbine is shown and described herein, the present disclosure is not limited to an industrial or land-based gas turbine engine unless otherwise specified in the claims. For example, the technology as described herein may be used in any type of turbomachine including but not limited to a steam turbine, an aircraft gas turbine, or a marine gas turbine.

As shown, gas turbine engine 10 generally includes an inlet section 12, a compressor section 14 disposed downstream of the inlet section 12, a plurality of combustors 17 (shown in FIG. 2) within a combustion section 16 disposed downstream of the compressor section 14, a turbine section 18 disposed downstream of the combustion section 16, and an exhaust section 20 disposed downstream of the turbine section 18. Additionally, the gas turbine engine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14. The compressor section 14 further includes a plurality of stationary vanes (not shown), which are arranged in stages with the rotor blades 26 and which direct the flow against the rotor blades 26.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18. The turbine section 18 further includes a plurality of stationary vanes (not shown), which are arranged in stages with the rotor blades 30 and which direct the flow against the rotor blades 30.

During operation, a working fluid such as air flows through the inlet section 12 and into the compressor section 14 where the air is progressively compressed by multiple compressor stages of rotating blades and stationary vanes, thus providing pressurized air to the combustors 17 of the combustion section 16. The pressurized air is mixed with fuel and burned within each combustor 17 to produce combustion gases 34. The combustion gases 34 flow through the hot gas path 32 from the combustion section 16 into the turbine section 18, in which energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine engine 10 via the exhaust section 20.

Figure 2:
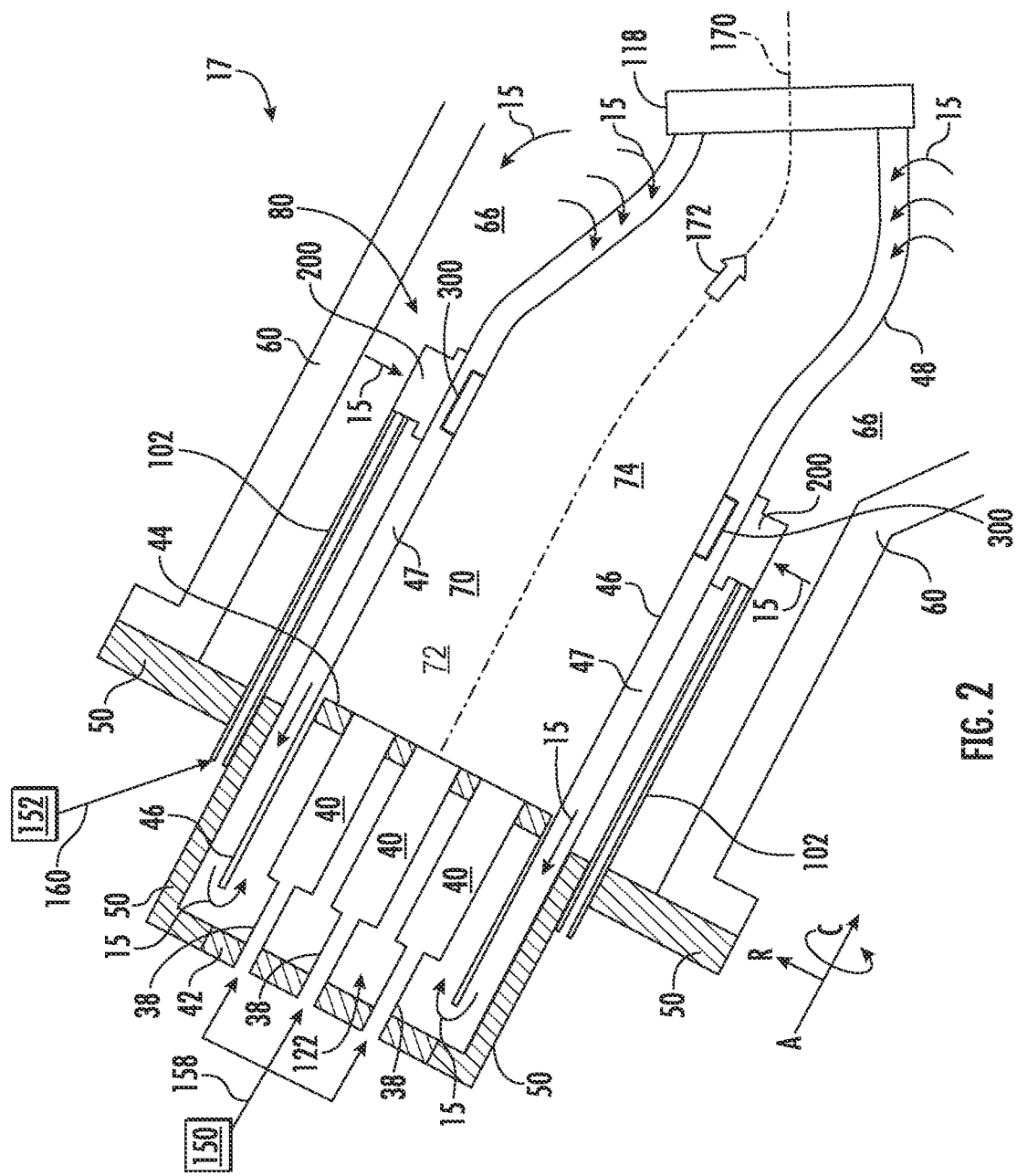
FIG. 2 illustrates a schematic view of a combustor as may be employed in the turbomachine of FIG. 1, in accordance with embodiments of the present disclosure.

FIG. 2 is a schematic representation of a combustor 17, as may be included in a can annular combustion system 16 for the gas turbine 10. In a can annular combustion system, a plurality of combustors 17 (e.g., 8, 10, 12, 14, 16, or more) are positioned in an annular array about the shaft 22 that connects the compressor section 14 to the turbine section 18.

As shown in FIG. 2, the combustor 17 may define an axial direction A that extends along an axial centerline 170. The combustor may also define a circumferential direction C which extends around the axial direction A and the axial centerline 170. The combustor 17 may further define a radial direction R perpendicular to the axial direction A and the axial centerline 170.

As shown in FIG. 2, the combustor 17 includes a combustion liner 46 that defines a combustion chamber 70. The combustion liner 46 may be positioned within (i.e., circumferentially surrounded by) an outer sleeve 48, such that an annulus 47 is formed therebetween. The combustion liner 46 may contain and convey combustion gases to the turbine section 18. The combustion liner 46 defines the combustion chamber 70 within which combustion occurs. As shown in FIG. 2, the combustion liner 46 may extend between fuel nozzles 40 and an aft frame 118. The combustion liner 46 may have a generally cylindrical liner portion and a tapered transition portion that is separate from the generally cylindrical liner portion, as in many conventional combustion systems. Alternately, the combustion liner 46 may have a unified body (or "unibody") construction, in which the generally cylindrical portion and the tapered portion are integrated with one another. Thus, any discussion of the combustion liner 46 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine section 18 are integrated into a single unit, sometimes referred to as a "transition nozzle" or an "integrated exit piece."

FIG. 2 illustrates a combustor 17 having both fuel nozzles 40 and one or more fuel injection assemblies 80 (also referred to as an axial fuel staging (AFS) system), as discussed further herein. The at least one fuel nozzle 40 may be positioned at the forward end of the combustor 17. Fuel may be directed through fuel supply conduits 38, which extend through an end cover 42, and into the fuel nozzles 40. The fuel nozzles 40 convey the fuel and compressed air 15 into a primary combustion zone 72, where combustion occurs. In some embodiments, the fuel and compressed air 15 are combined as a mixture prior to reaching the primary combustion zone 72.

The combustion liner 46 may be surrounded by an outer sleeve 48, which is spaced radially outward of the combustion liner 46 to define an annulus 47 through which compressed air 15 flows to a head end of the combustor 17. For example, compressed air 15 may enter the annulus 47 through the outer sleeve 48 (e.g., through impingement holes proximate the aft frame 118) and travel towards the end cover 42, such that the compressed air 15 within the annulus 47 flows opposite the direction of combustion gases 172 (34 in FIG. 1) within the combustion liner 46. Heat is transferred convectively from the combustion liner 46 to the compressed air 15, thus cooling the combustion liner 46 and warming the compressed air 15.

In some embodiments, the outer sleeve 48 may include a flow sleeve and an impingement sleeve coupled to one another. The flow sleeve may be disposed at the forward end, and the impingement sleeve may be disposed at the aft end. Alternately, the outer sleeve 48 may have a unified body (or "unisleeve") construction, in which the flow sleeve and the impingement sleeve are integrated with one another in the axial direction. As before, any discussion of the outer sleeve 48 herein is intended to encompass both conventional combustion systems having a separate flow sleeve and impingement sleeve and combustion systems having a unisleeve outer sleeve.

The forward casing 50 and the end cover 42 of the combustor 17 define the head end air plenum 122, which includes the one or more fuel nozzles 40. The fuel nozzles 40 may be any type of fuel nozzle, such as bundled tube fuel nozzles or swirler nozzles (often referred to as "swozzles"). The fuel nozzles 40 may be positioned within the head end air plenum 122 defined at least partially by the forward casing 50. In many embodiments, the fuel nozzles 40 may extend from the end cover 42. For example, each fuel nozzle 40 may be coupled to an aft surface of the end cover 42 via a flange (not shown). As shown in FIG. 2, the at least one fuel nozzle 40 may be partially surrounded by the combustion liner 46. The aft, or downstream ends, of the fuel nozzles 40 extend through or collectively define a cap plate 44 that defines the upstream end of the combustion chamber 70.

The fuel nozzles 40 may be in fluid communication with a first fuel supply 150 configured to supply a first fuel 158 to the fuel nozzles 40. In many embodiments, the first fuel 158 may be a fuel mixture containing natural gas (such as methane, ethane, propane, or other suitable natural gas) and/or hydrogen. In other embodiments, the first fuel 158 may be pure natural gas or pure hydrogen (e.g., 100% hydrogen, which may or may not contain some amount of contaminants), such that the first fuel is not a mixture of multiple fuels. In exemplary embodiments, the first fuel 158 and compressed air 15 may mix together within the fuel nozzles 40 to form a first mixture of compressed air 15 and the first fuel 158 before being ejected (or injected) by the fuel nozzles 40 into the primary combustion zone 72.

The forward casing 50 may be fluidly and mechanically connected to a compressor discharge casing 60, which defines a high pressure plenum 66 around the combustion liner 46 and the outer sleeve 48. Compressed air 15 from the compressor section 14 travels through the high pressure plenum 66 and enters the combustor 17 via apertures (not shown) in the downstream end of the outer sleeve 48 (as indicated by arrows near an aft frame 118). Compressed air travels upstream through the annulus 47 and is turned by the end cover 42 to enter the fuel nozzles 40 and to cool the head end. In particular, compressed air 15 flows from high pressure plenum 66 into the annulus 47 at an aft end of the combustor 17, via openings defined in the outer sleeve 48. The compressed air 15 travels upstream from the aft end of the combustor 17 to the head end air plenum 122, where the compressed air 15 reverses direction and enters the fuel nozzles 40.

In the exemplary embodiment, the fuel injection assembly 80 is provided to deliver a second fuel/air mixture to a secondary combustion zone 74 downstream from the primary combustion zone 72. For example, a second flow of fuel and air may be introduced by one or more fuel injectors 200 to the secondary combustion zone 74.

The primary combustion zone 72 and the secondary combustion zone 74 may each be portions of the combustion chamber 70 and therefore may be defined by the combustion liner 46. For example, the primary combustion zone 72 may be defined from an outlet of the fuel nozzles 40 to the fuel injector 200, and the secondary combustion zone 74 may be defined from the fuel injector 200 to the aft frame 118. In this arrangement, the forwardmost boundary of the fuel injector 200 may define the end of the primary combustion zone 72 and the beginning of the secondary combustion zone 74 (e.g., at an axial location where a second flow of fuel and air are introduced).

Such a combustion system having axially separated combustion zones is described as an "axial fuel staging" (AFS) system. The fuel injection assemblies 80 may be circumferentially spaced apart from one another on the outer sleeve 48 (e.g., equally spaced apart in some embodiments). In many embodiments, the combustor 17 may include four fuel injection assemblies 80 spaced apart from one another and configured to inject a second mixture of fuel and air into a secondary combustion zone 74 via the fuel injector 200. In other embodiments, the combustor 17 may include any number of fuel injection assemblies 80 (e.g., 1, 2, 3, or up to 10).

As shown in FIG. 2, each fuel injection assembly 80 may include a fuel injector 200 and a boss 300 circumferentially and axially aligned with the fuel injector 200. The fuel injector 200 may be coupled to the outer sleeve 48, and the boss 300 may be coupled to the combustion liner 46 and disposed within the annulus 47. Particularly, the fuel injector 200 may couple to a radially outer surface of the outer sleeve 48, and the boss 300 may couple to a radially outer surface of the combustion liner 46. The boss 300 may be radially spaced apart from the fuel injector 200. As discussed in more detail below, the boss 300 may be fluidly coupled to the annulus 47, and the fuel injector 200 may be fluidly coupled to the high pressure plenum 66.

A fuel supply conduit 102 may fluidly couple to the fuel injector 200. The fuel injector 200 may be in fluid communication with a second fuel supply 152 configured to supply a second fuel 160 to the fuel injector 200 via the fuel supply conduit 102. The second fuel supply 152 may be the same or different than the first fuel supply 150, such that the fuel injector 200 may be supplied with the same fuel or a different fuel than the fuel nozzles 40. In many embodiments, the second fuel 160 may be a fuel mixture containing natural gas (such as methane, ethane, propane, or other suitable natural gas) and/or hydrogen. In other embodiments, the second fuel 160 may be pure natural gas or pure hydrogen (e.g., 100% hydrogen, which may or may not contain some amount of contaminants), such that the first fuel is not a mixture of multiple fuels. In exemplary embodiments, the second fuel 160 and compressed air 15 may mix together within the fuel injector 200 to form a mixture of compressed air 15 and the second fuel 160 before being injected into the boss 300, in which the mixture is further mixed (or diluted) with air from the annulus 47 prior to being injected into the secondary combustion zone 74.

Figure 3:
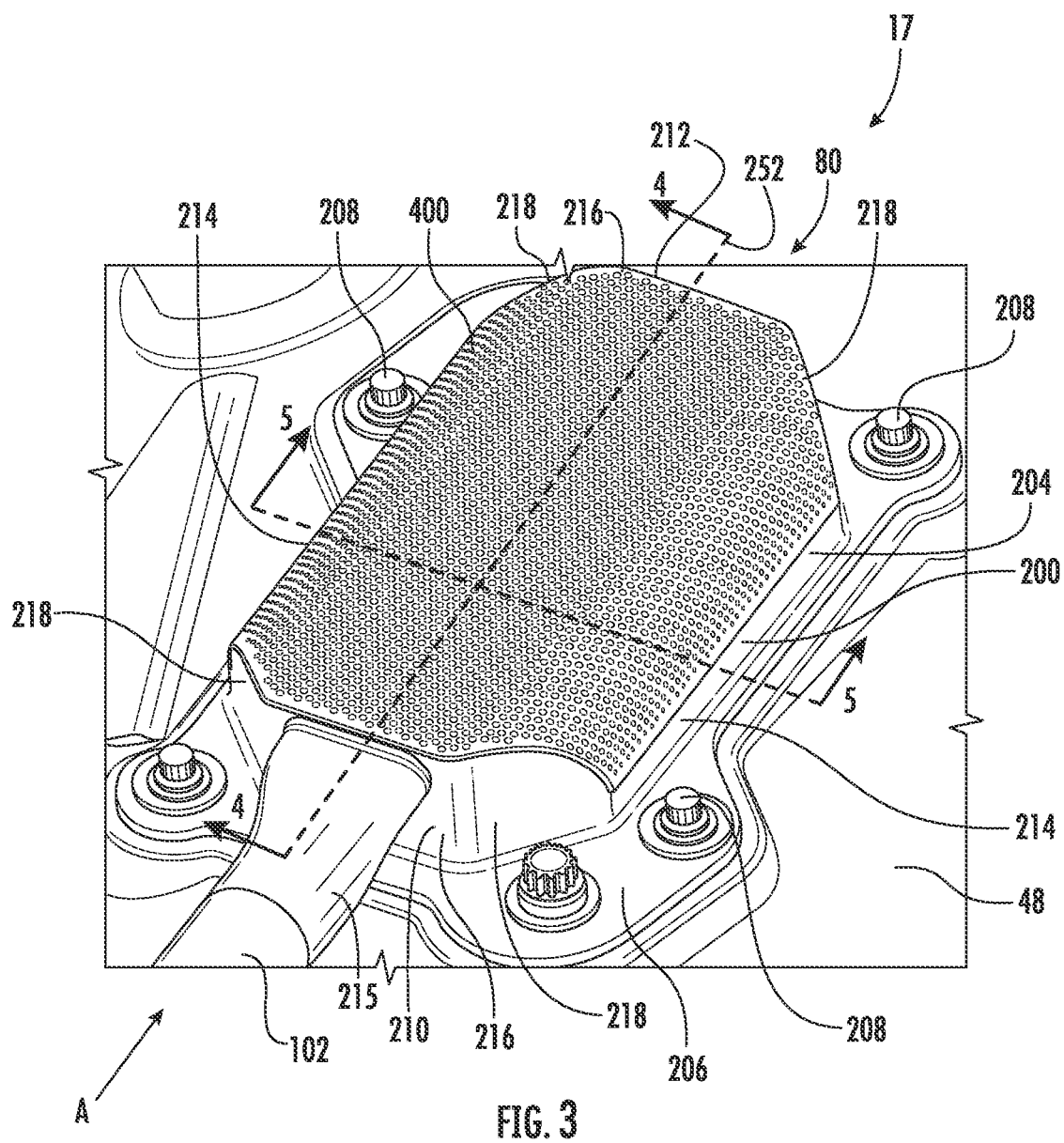
FIG. 3 illustrates a close-up perspective view of a portion of a combustor having a fuel injection assembly, in accordance with embodiments of the present disclosure.

Referring now to FIG. 3, a close-up perspective view of a portion of the combustor 17 and the fuel injection assembly 80 is illustrated in accordance with embodiments of the present disclosure. As shown, the fuel injection assembly 80 may include the fuel injector 200 coupled to the outer sleeve 48. Particularly, the fuel injector 200 may couple to a radially outer or exterior surface of the outer sleeve 48. For example, the fuel injector 200 may include a main body 204 and an injector flange 206 extending outwardly from the main body 204. One or more fasteners 208 (such as threaded fasteners or other suitable fasteners) may extend through the injector flange 206 and into the outer sleeve 48 to couple the fuel injector 200 to the outer sleeve 48. One or more of the fasteners 208 may extend through the injector flange 206 and into the boss 300 (exemplary boss 300 shown in FIGS. 8-10).

In many embodiments, the main body 204 of the fuel injector 200 may extend along an axial centerline 252 between a forward end wall 210 and an aft end wall 212. In many embodiments, the axial centerline 252 of the fuel injector 200 may generally align with the axial direction A of the combustor 17 (or may be slightly angled relative to the axial direction A of the combustor 17). Side walls 214 may extend generally axially between the forward end wall 210 and the aft end wall 212 with respect to the axial centerline 252 of the fuel injector 200. In many embodiments, the forward end wall 210 and the aft end wall 212 may each include a straight portion 216 and slanted portions 218. The straight portion 216 is oriented generally perpendicularly to the axial centerline 252 and slanted portions 218 each extend between the straight portion 216 and a respective side wall 214.

A conduit fitting 215 may extend outwardly from the forward end wall 210 of the main body 204 along the axial centerline 252. Particularly, the conduit fitting 215 may extend outwardly along the axial centerline 252 of the straight portion 216 of the forward end wall 210. The conduit fitting 215 may be fluidly coupled to the fuel supply conduit 102 such that it functions to receive a flow of fuel from the fuel supply conduit 102. The conduit fitting 215 may have any suitable size and shape and may be formed integrally with, or coupled to, any suitable portion(s) of the fuel injector 200 that enables the conduit fitting 215 to function as described herein.

In exemplary embodiments, the fuel injection assembly 80 may further include a debris filter 400 coupled to the fuel injector 200. The debris filter 400 may surround the fuel injector 200 such that all air entering the fuel injector 200 from high pressure plenum 66 passes through the debris filter 400. For example, the debris filter 400 may extend between the forward end wall 210, the aft end wall 212, and the side walls 214. The debris filter 400 may include a plurality of holes 402 (FIG. 5) defined therethrough that allow for fluid communication between the high-pressure plenum 66 and the fuel injector 200. The plurality of holes 402 may be sized to prevent debris (such as soot or other debris) from entering the fuel injector 200, which advantageously prevents the premix tubes 226 and their respective fuel ports 240 from being blocked. Additionally, the debris filter 400 may function as an inlet flow conditioner. That is, the debris filter 400 may function to reduce the non-uniformity of the compressed air from the high-pressure plenum 66 before it enters the fuel injector 200.

Figure 4:
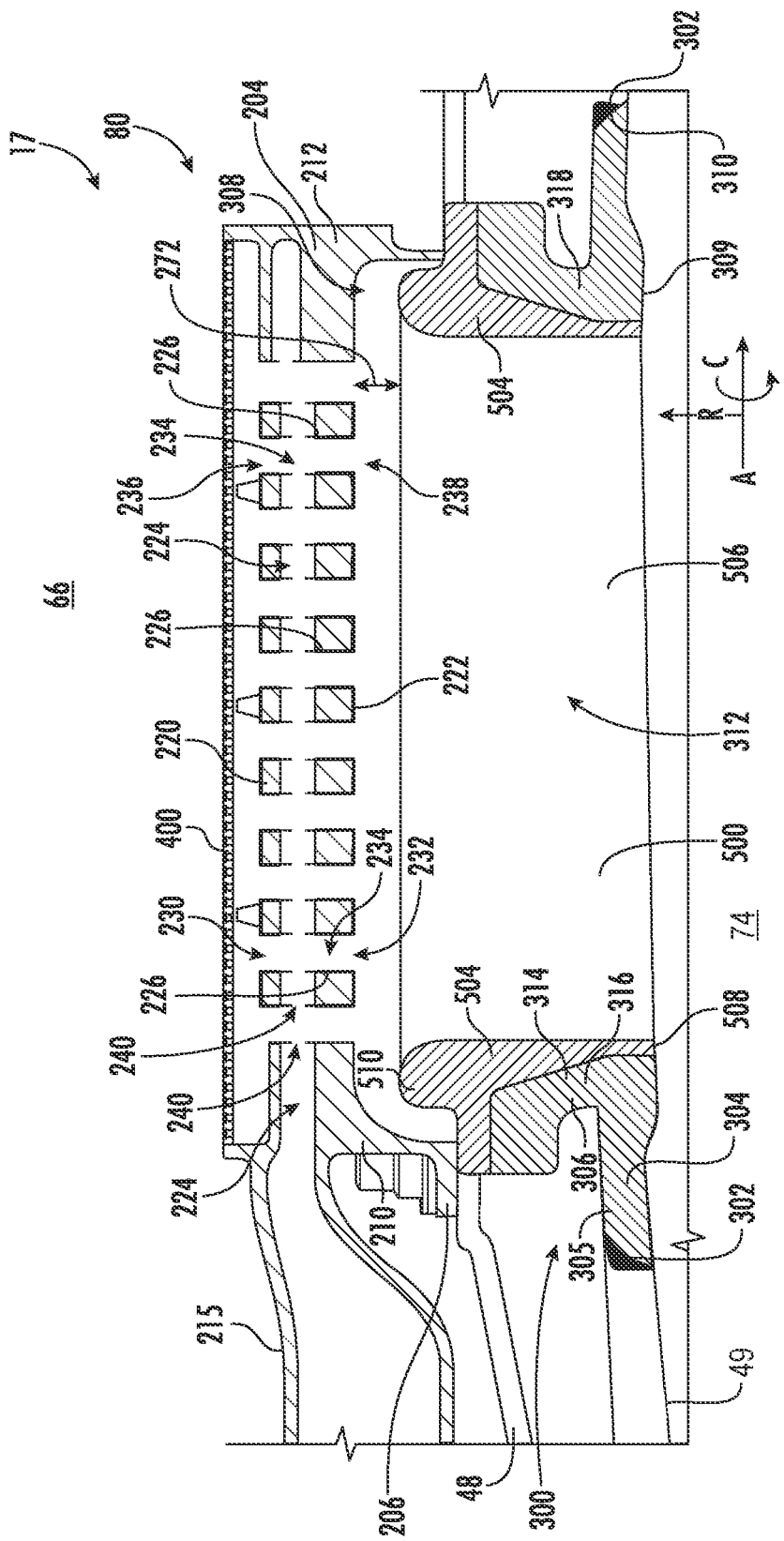
FIG. 4 illustrates a cross-sectional view of the combustor from along the line 4-4 shown in FIG. 3, in accordance with embodiments of the present disclosure.
Figure 5:
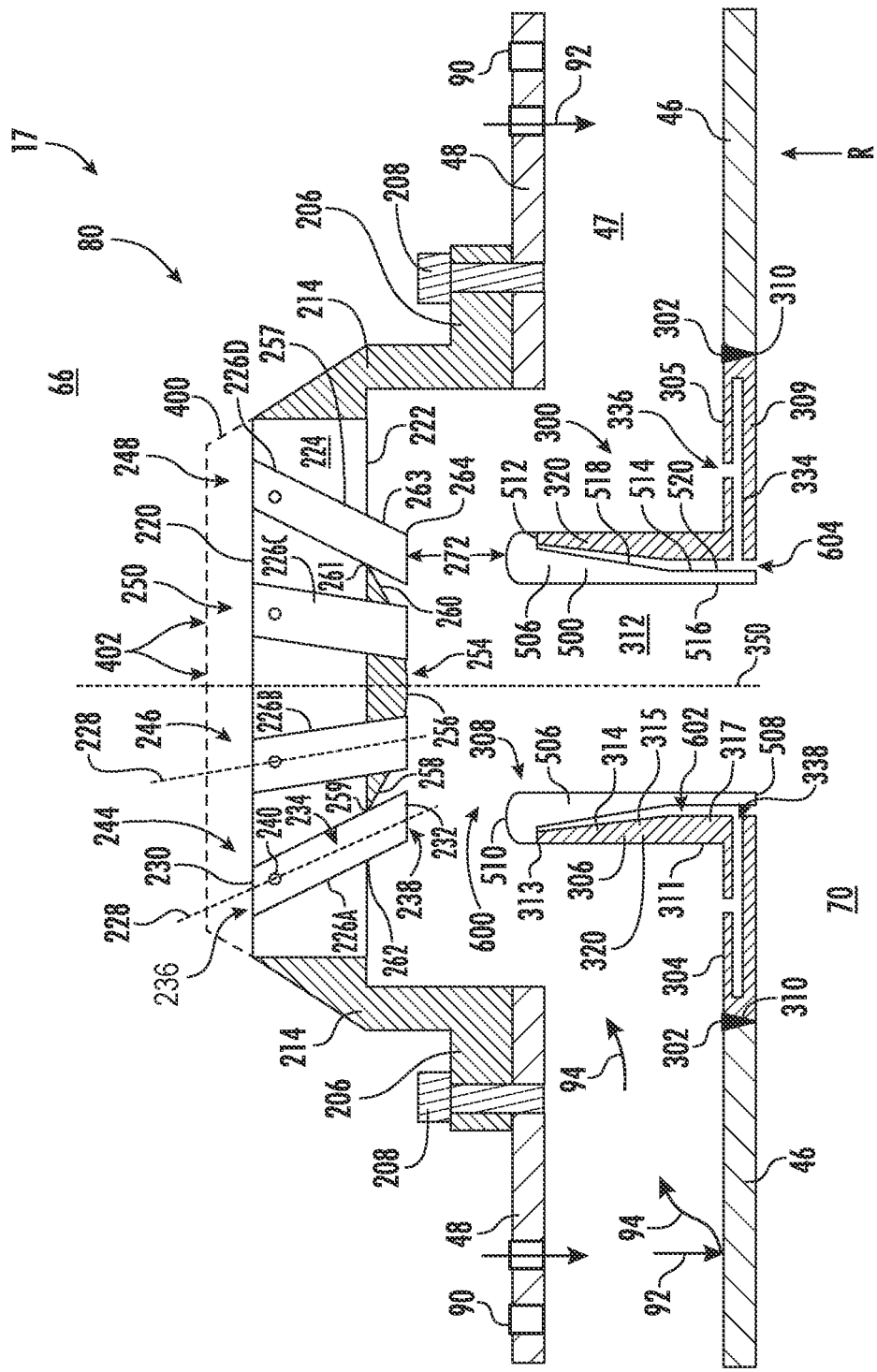
FIG. 5 illustrates a cross-sectional view of the combustor from along the line 5-5 shown in FIG. 3.

FIGS. 4 and 5 each illustrate different cross-sectional views of the combustor 17, including the fuel injection assembly 80, in accordance with embodiments of the present disclosure. Specifically, FIG. 4 illustrates a cross-sectional view of the combustor 17 from along the line 4-4 shown in FIG. 3, and FIG. 5 illustrates a cross-sectional view of the combustor 17 from along the line 5-5 shown in FIG. 3.

As shown in FIGS. 4 and 5, the combustor 17 may include a combustion liner 46 defining a combustion chamber 70, which includes the secondary combustion zone 74. An outer sleeve 48 may be radially spaced apart from the combustion liner 46, such that an annulus 47 is defined between the outer sleeve 48 and the combustion liner 46. The combustor 17, including the fuel injection assembly 80, may be disposed within the high pressure plenum 66. The annulus 47 may be fluidly coupled to the high-pressure plenum 66 via one or more impingement apertures 90. The impingement apertures 90 may be oriented and sized to direct high pressure air 92 from the high pressure plenum 66 to impinge upon an outer surface of the combustion liner 46. During the impingement process, the high pressure air 92 experiences a pressure drop by passing through impingement apertures 90 to become low pressure air 94 and undergoes an energy transfer by removing heat from the combustion liner 46 (i.e., the low pressure air 94 picks up heat). The low pressure air 94 may be supplied to the fuel injector 200, as discussed below.

The fuel injection assembly 80 includes the fuel injector 200, the boss 300, the debris filter 400, and an insert 500 (which may be formed integrally with the boss 300 in some embodiments). The fuel injector 200 may be coupled (e.g., via one or more fasteners 208) to the outer sleeve 48, and the fuel injector 200 may extend radially outward from the outer sleeve 48 into the high-pressure plenum 66. The boss 300 may be fixedly coupled (e.g., via an annular weld joint 302) to the combustion liner 46 and disposed within the annulus 47.

In many embodiments, the boss 300 may form at least a portion of an annular wall 308. The annular wall 308 may define a mixing channel 312 that extends along a center axis 350. The center axis 350 may be disposed in the center of the mixing channel 312 and may be oriented generally radially (e.g., generally parallel to the radial direction R of the combustor 17). Particularly, the boss 300 may include a flange portion 304 and an annular wall portion 306. The annular wall portion 306 may couple to the insert 500, such that the annular wall portion 306 and the insert collectively form the annular wall 308.

As should be appreciated, while the insert 500 and the boss 300 are illustrated and described as being separate components (which may be advantageous for testing and/or repairability due to easily replacing the insert 500), the insert 500 may be integrally formed with the boss 300 in other embodiments (which may be advantageous for reducing manufacturing costs). In such embodiments, the boss 300 may include the annular wall 308, such that the mixing channel 312 is entirely defined by the boss 300.

The flange portion 304 may extend generally axially and circumferentially, and the annular wall portion 306 may extend generally radially from the flange portion 304 (i.e., generally perpendicular from the flange portion 304. The flange portion 304 may be fixedly coupled (e.g., via the annular weld joint 302) to the combustion liner 46.

The flange portion 304 may partially define the combustion chamber 70. For example, the flange portion 304 may include a radially outer surface 305 and a radially inner surface 309. The radially inner surface 309 may align with an interior surface 49 of the combustion liner 46, such that the flange portion 304 partially defines the combustion chamber 70 (e.g., the exhaust gases may contact the radially inner surface 309 of the flange portion 304). The flange portion 304 may extend outwardly from the annular wall portion 306 to an annular edge 310. The annular edge 310 may be the terminal end of the flange portion 304. The annular edge 310 may be welded to the combustion liner 46 (e.g., via the annular weld joint 302). The annular wall portion 306 may extend generally radially to a terminal end 313.

In many embodiments, the boss 300 may include an interior surface 314 having a slanted portion 315 (e.g., slanted, angled, or oblique with respect to the radial direction R and/or the center axis 350) and a straight portion 317.

The insert 500 may define an outer surface 514 and an inner surface 516 (which defines the mixing channel 312). The outer surface 514 may include a slanted portion 518 and a straight portion 520. The slanted portion 518 of the outer surface 514 of the insert 500 may be complementary (or parallel and co-extending) to the slanted portion 315 of the interior surface 314 of the annular wall portion 306 of the boss 300. Similarly, the straight portion 520 of the outer surface 514 of the insert 500 may be complementary (or parallel and co-extending) to the straight portion 317 of the interior surface 314 of the annular wall portion 306 of the boss 300. As discussed below in more detail, the outer surface 514 of the insert 500 may be spaced apart from the interior surface 314 of the boss 300 such that a cooling gap 602 is defined between the boss 300 and the insert 500.

As shown by FIGS. 4 and 5 collectively, the insert 500 may be annular (e.g., the insert 500 may surround the center axis 350). The insert 500 may include end walls 504 axially spaced apart from one another and side walls 506 connecting the end walls 504. The end walls 504 may be generally perpendicular to the side walls 506, and the side walls 506 may extend generally axially in many embodiments. The insert 500 may define the mixing channel 312, which may be generally rectangularly shaped (or stadium shaped). That is, the side walls 506 may be longer than the end walls 504, such that the mixing channel 312 is elongated in the axial direction A, which advantageously allows the fuel injection assembly to introduce a larger amount of fuel/air without impeding a large portion of the annulus 47.

The insert 500 may extend radially between a base 508 and a tip 510. The base 508 may be generally aligned or flush (e.g., radially) with the radially inner surface 309 of the flange portion 304. The tip 510 may be arcuate or rounded, which may advantageously prevent fuel/air from the fuel injector 200 from creating flow vortices at the tip 510. Additionally, the insert 500 may define a step 512 at a radially outer end of the slanted surface. The step 512 may contact the terminal end 313 of the annular wall portion 306 of the boss 300, such that the insert 500 is seated on (i.e., in contact with) the terminal end 313 of the annular wall portion 306 of the boss 300.

As shown in FIGS. 4 and 5, the fuel injector 200 may further include a radially outer wall 220 and a radially inner wall 222 that at least partially define a fuel plenum 224. The radially outer wall 220 and the radially inner wall 222 may extend between the forward end wall 210, the aft end wall 212, and the side walls 214 of the fuel injector 200. In this way, the fuel plenum 224 may be defined collectively by the radially outer wall 220, the radially inner wall 222, the forward end wall 210, the aft end wall 212, and the side walls 214. The fuel plenum 224 may receive a flow of fuel via the conduit fitting 215.

In exemplary embodiments, the fuel injector 200 may further include a plurality of premix tubes 226 each extending along an injection axis 228 from an inlet end 230 on the radially outer wall 220, through the fuel plenum 224 and the radially inner wall 222, to an outlet end 232. Each of the premix tubes 226 may define a premix passage 234 extending between an inlet 236 at the inlet end 230 to an outlet 238 at the outlet end 232. In many embodiments, the injection axis 228 of each premix tube 226 may be the centerline of the premix tube 226. In many embodiments, each premix tube 226 of the plurality of premix tubes 226 may include one or more fuel ports 240 that fluidly couple the fuel plenum 224 to the premix passage 234. For example, as shown in FIG. 4, each premix passage 234 may include two fuel ports 240 (e.g., a forward fuel port and an aft fuel port) diametrically opposed to one another, which advantageously provides for uniform fuel distribution within the premix passage 234.

In various embodiments, the plurality of premix tubes 226 may be fluidly coupled to a high-pressure air source (such as the high pressure plenum 66 shown in FIG. 5). For example, the premix passages 234 may receive a flow of high-pressure air 92 (compressed air 15 in FIG. 2) from the high pressure plenum 66 via the inlet 236. The mixing channel 312 may be fluidly coupled to a low pressure air source (e.g., the annulus 47). The mixing channel 312 may receive a mixture of high pressure air 92 and fuel from each of the premix tubes 226. Additionally, the mixing channel 312 may receive low pressure air 94 from the annulus 47.

The boss 300 and the insert 500 may both be radially spaced apart from the fuel injector 200, such that a radial gap 272 is defined between the insert 500 and the fuel injector 200. For example, the radial gap 272 may be defined between the tips 264 of the premix tubes 226 and the tip 510 of the insert 500. A multi-fluid interaction region 600 may be defined between the outlets 238 of the premix tubes 226 and the inlet of the mixing channel 312. For example, the multi-fluid interaction region 600 may receive a mixture of high-pressure air 92 and fuel from each of the premix tubes 226. Additionally, the multi-fluid interaction region 600 may receive low pressure air 94 from the annulus 47, which advantageously further mixes the fuel/air within the mixing channel 312 and dilutes the fuel closer to a desired fuel/air ratio prior to delivering the fuel/air to the combustion chamber 70.

As shown in FIG. 5, the injection axis 228 of each premix tube 226 may be slanted towards the center axis 350 of the mixing channel 312. For example, each premix tube 226 may be oblique relative to the radial direction R, such that the injection axis 228 is angled relative to the generally radially oriented center axis 350 of the mixing channel 312. In this way, the outlet end 232 of each premix tube 226 may be closer to the center axis 350 of the mixing channel 312 than the inlet end 230.

In exemplary embodiments, the plurality of premix tubes 226 may be arranged in a plurality of rows. As shown from left to right in FIG. 5, the plurality of rows may include a first outer row 244, a first inner row 246, a second inner row 250, and a second outer row 248. The first outer row 244 may be disposed between a side wall 214 and the first inner row 246. The first inner row 246 may be disposed between the first outer row 244 and the second inner row 250. The second inner row 250 may be disposed between the first inner row 246 and the second outer row 248. The second outer row 248 may be disposed between the second inner row 250 and a side wall 214. The first outer row 244 and the first inner row 246 may be disposed on a first side of the center axis 350, and the second outer row 248 and the second inner row 250 may be disposed on a second side of the center axis 350. In this way, the first outer row 244 and the first inner row 246 of premix tubes 226 may be angled opposite the second outer row 248 and the second inner row 250 of premix tubes 226.

Each of the premix tubes 226 may be oriented oblique to the radial direction R (and/or the center axis 350). The premix tubes 226 disposed in the outer rows 244, 248 may be more slanted, inclined, or angled relative to the center axis 350 than the premix tubes 226 disposed in the inner rows 246, 250. For example, the premix tubes 226 disposed in the outer rows 244, 248 may be slanted between about 10% and about 50% more (or such as between about 10% and about 40%, or such as between about 10% and about 30%, or such as between about 10% and about 20%) than the premix tubes 226 disposed in the inner rows 246, 250.

Figure 7:
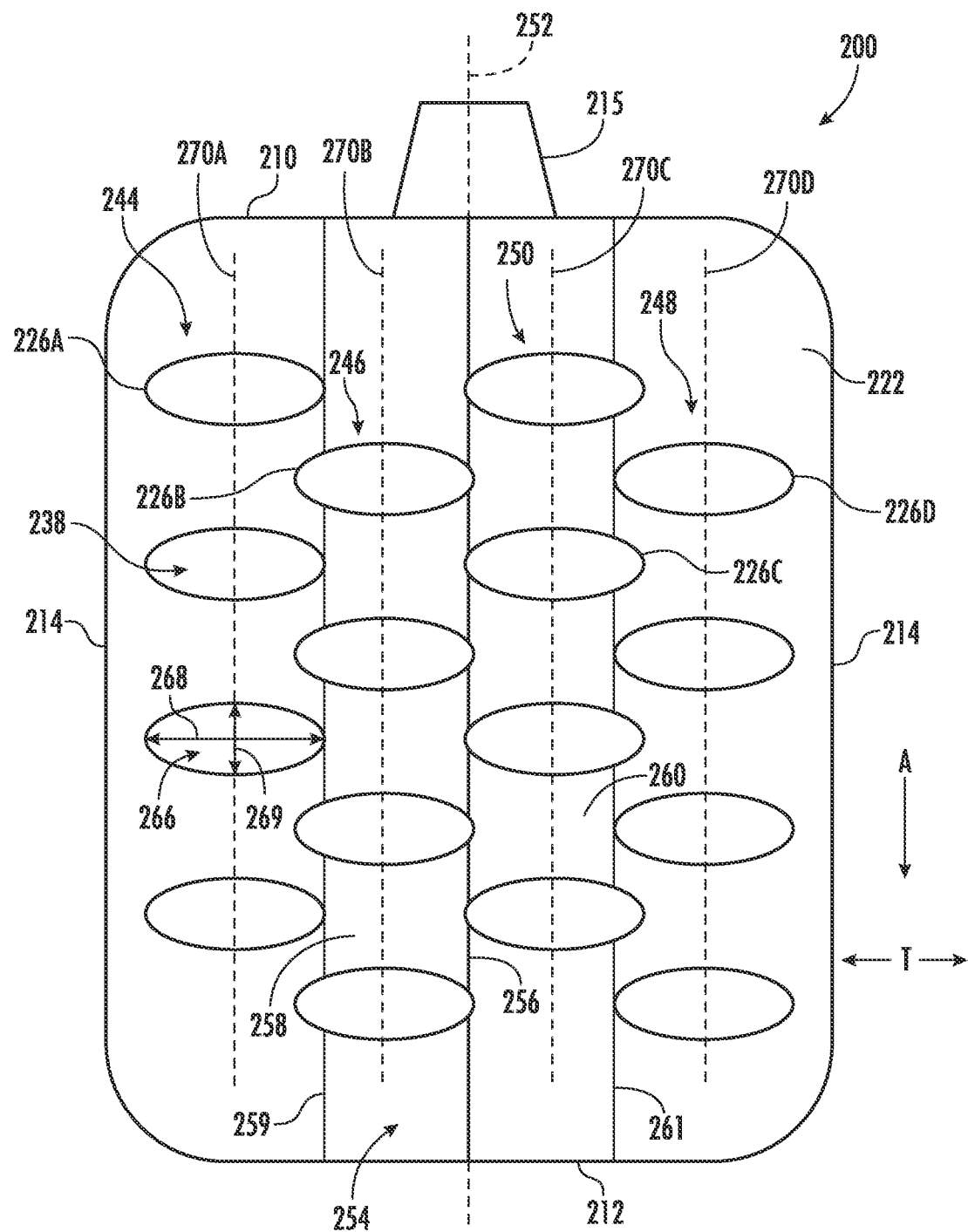
FIG. 7 illustrates a planar view of the fuel injector from along the line 7-7 shown in FIG. 6, in accordance with embodiments of the present disclosure.

Referring still to FIG. 5, the fuel injector 200 may further include a sloped support 254 that extend from the radially inner wall 222 and couples to one or more premix tubes 226 of the plurality of premix tubes 226. The sloped support 254 may extend radially inwardly from the radially inner wall 222 to a peak 256. Particularly, the sloped support 254 may include a peak 256, a first sloping surface 258 extending between the peak 256 and a first terminal end 259, and a second sloping surface 260 extending between the peak 256 and a second terminal end 261. The peak 256 may be the radially inward-most point of the sloped support 254, and the peak 256 may couple to the tip 264 of one or more premix tubes 226 (e.g., the inner two premix tubes). The first and second terminal ends 259, 261 may be where the sloped support connects (or transitions) to the radially inward wall 222. The first sloping surface 258 may diverge radially outwardly from the peak 256 to the first terminal end 259. Similarly, the second sloping surface 260 may diverge radially outwardly from the peak 256 to the second terminal end 261. The peak 256 of the sloped support 254 may be disposed along the center axis 350 and along the axial centerline 252 of the fuel injector 200 (FIG. 7).

The sloped support 254 may advantageously provide increased structural integrity to the exterior portion 260 of the premix tubes 226 and the entire fuel injector 200. Additionally, the sloped support 254 may advantageously facilitate the additive manufacturing of the fuel injector 200 by preventing excessive overhang while additively manufacturing.

Figure 6:
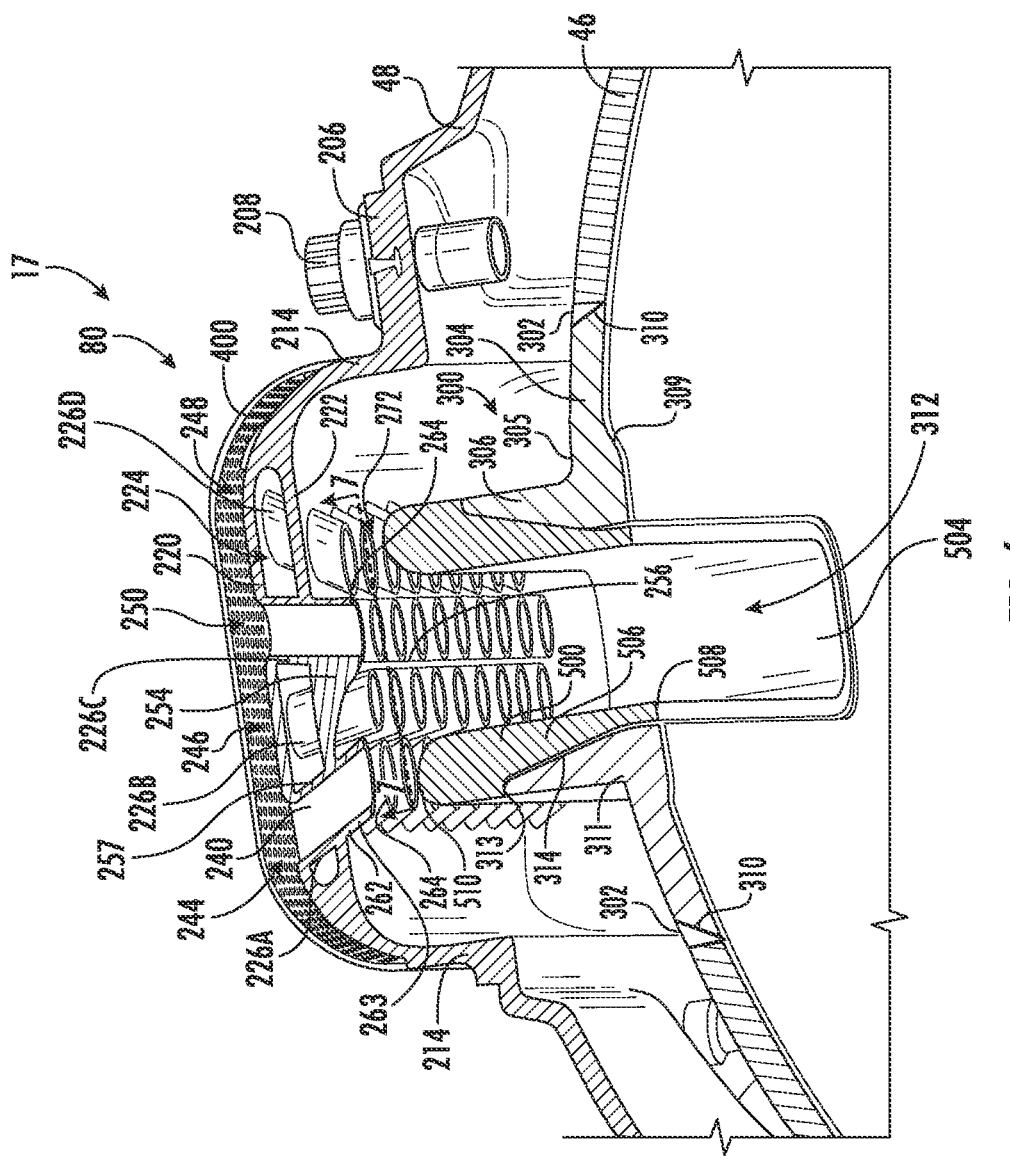
FIG. 6 illustrates a cross-sectional, enlarged, perspective view of a portion of a combustor having a fuel injection assembly, in accordance with embodiments of the present disclosure.

FIG. 6 illustrates a cross-sectional, enlarged, perspective view of a portion of the combustor 17, including the fuel injection assembly 80, in accordance with embodiments of the present disclosure. FIG. 7 illustrates a planar view of the fuel injector 200 from along the line 7-7 shown in FIG. 6. Particularly, FIG. 7 schematically illustrates a view of the fuel injector 200 in an axial-transverse plane, with the transverse direction T being tangential to the circumferential direction C and perpendicular to the center axis 350. As shown in FIGS. 6 and 7, which will be discussed in more detail below, neighboring rows in the plurality of rows of premix tubes 226 may be staggered relative to one another (e.g., axially staggered or offset relative to the axial centerline 252). As shown in FIG. 7, the sloped support 254 (including the peak 256, the first sloped surface 258, and the second sloped surface 260) may extend along the axial centerline 252 from the forward end wall 210 to the aft end wall 212 of the fuel injector 200.

The premix tubes 226 disposed within the first outer row 244 may be referred to as first outer premix tube(s) 226A. The premix tubes 226 disposed within the first inner row 246 may be referred to as first inner premix tube(s) 226B. The premix tubes 226 disposed within the second inner row 250 may be referred to a second inner premix tube(s) 226C. The premix tubes 226 disposed within the second outer row 248 may be referred to as second outer premix tube(s) 226D.

Each premix tube 226A-D may extend radially inwardly from the radially inner wall 222 towards the boss 300 and the insert 500. For example, as shown in FIG. 5, each premix tube 226A-D may include an interior portion 257 and an exterior portion 263. The interior portion 257 may be housed within (i.e., is interior to) the fuel plenum 224 and may extend between the radially outer wall 220 and the radially inner wall 222. The exterior portion 263 may extend radially inwardly from the radially inner wall 222 towards the boss 300 and the insert 500 (i.e., may be exterior to the fuel plenum 224). For example, the exterior portion 260 of each premix tube 226A-D may extend from a base 262 at the radially inner wall 222 to a tip 264 (e.g., at a radially inward terminal end of the respective premix tube).

As shown in FIG. 7, each premix tube 226 in a row 244, 246, 250, 248 of premix tubes 226A-D may be aligned along a respective row axis 270A-D with other premix tubes 226A-D in the respective row 244, 246, 250, 248. Each of the row axes 270A-D may be generally parallel to the axial centerline 252 of the fuel injector 200 and/or parallel to the axial direction A of the combustor 17. Each of the row axes 270A-D may extend through a center point of each of the premix tubes 226A-D aligned along the respective row axis 270A-D. In many embodiments, each of the first outer premix tubes 226A may be aligned along a row axis 270A. Each of the first inner premix tubes 226B may be aligned along a row axis 270B. Each of the second inner premix tubes 226C may be aligned along a row axis 270C. Each of the second outer premix tubes 226D may be aligned along a row axis 270D.

In exemplary embodiments, each row 244, 246, 248, 250 of premix tubes 226A-D may be offset relative to a neighboring row of premix tubes 226A-D, such that the rows are in a staggered arrangement. For example, each row 244, 246, 248, 250 of premix tubes 226A-D may be axially offset relative to the axial direction A with respect to a neighboring row of premix tubes 226A-D. For example, the premix tubes 226 disposed in the first outer row 244 and the second inner row 250 may be axially aligned with one another and axially offset from the premix tubes 226 disposed in the second outer row 248 and the first inner row 246. Similarly, the premix tubes 226 disposed in the first inner row 246 and the second outer row 248 may be axially aligned with one another and axially offset from the premix tubes 226 disposed in the first outer row 244 and the second inner row 250. This advantageously allows for a larger number of premix tubes 226 to be utilized for in the fuel injector 200 when compared to a fuel injector having a non-staggered arrangement.

In various embodiments, at least one premix tube 226 of the plurality of premix tubes 226 may define a non-circularly shaped opening in an axial-transverse plane. For example, the non-circularly shaped opening may include stadium (e.g., rectangle with rounded ends), diamond, rectangle, triangle, oval, or other non-circular shapes. In exemplary embodiments, as shown in FIG. 7, at least one premix tube 226 of the plurality of premix tubes 226 may define an elliptical shaped opening 266 in the axial-transverse plane. The elliptical shaped opening 266 may include a major axis 268 and a minor axis 269 mutually perpendicular to one another. The minor axis 269 may be generally parallel to the axial direction A of the combustor 17 and/or the axial centerline 252 of the fuel injector 200. The major axis 268 may be longer than the minor axis 269 and perpendicular to the axial direction A of the combustor and/or the axial centerline 252 of the fuel injector 200. The elliptical shaped opening 266 may advantageously enable better packing (e.g., of the premix tubes 226), flow interaction, mixing and reduced flame holding propensity when compared to other shapes (such as circular).

Figure 8:
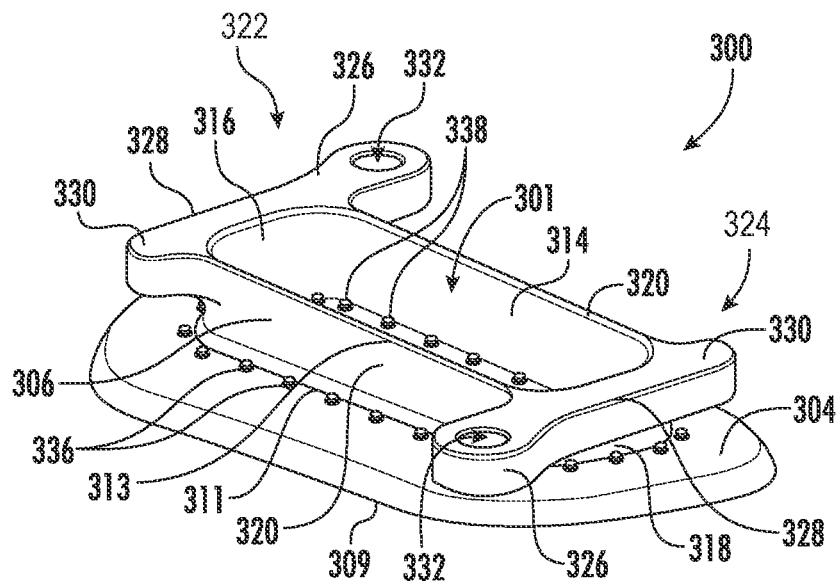
FIG. 8 illustrates a perspective view of a boss of a fuel injection assembly, in accordance with embodiments of the present disclosure.
Figure 9:
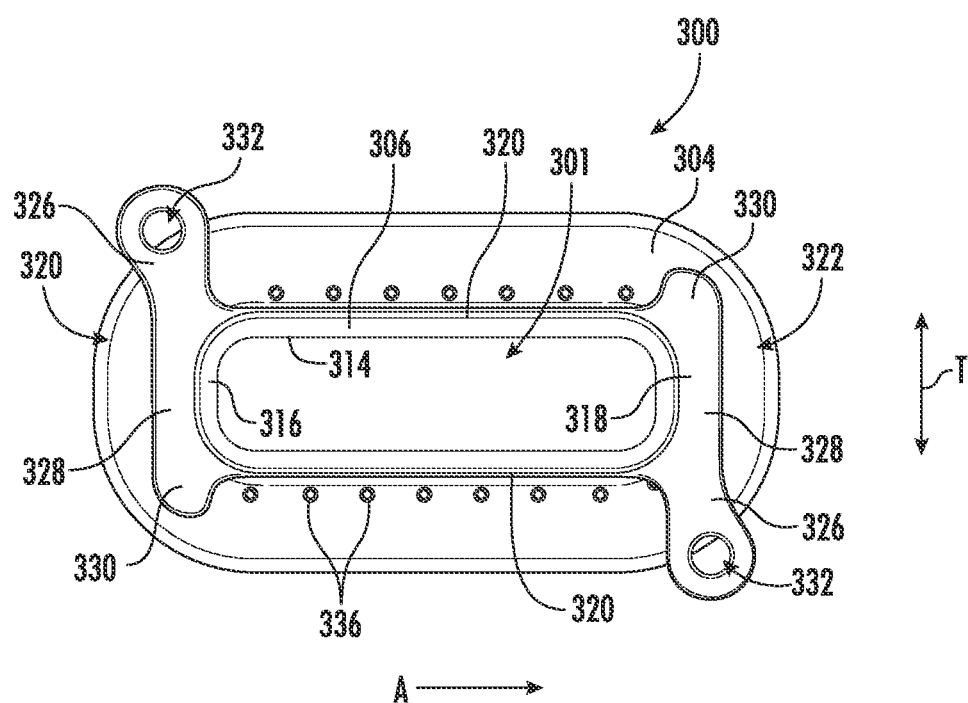
FIG. 9 illustrates a top down planar view of the boss of a fuel injection assembly of FIG. 8, in accordance with embodiments of the present disclosure.

Referring now to FIGS. 8 and 9, two different views of the boss 300 of the fuel injection assembly 80 are illustrated, in accordance with an exemplary aspect of the present disclosure. Particularly, FIG. 8 illustrates a perspective view of the boss 300, and FIG. 9 illustrates a top-down planar view of the boss 300, in accordance with embodiments of the present disclosure. As discussed above, the boss 300 may include a flange portion 304 and an annular wall portion 306. The annular wall portion 306 may couple to the insert 500, such that the annular wall portion 306 and the insert 500 collectively form the annular wall 308 (FIG. 5). The boss 300 may extend generally radially along the center axis 350. The center axis 350 may be aligned with the radial direction R when the boss 300 is installed in a combustor 17. Additionally, the boss 300 may include an axial centerline 352 perpendicular to the center axis 350. The axial centerline 352 may be generally parallel with the axial direction A of the combustor 17 when the boss 300 is installed in a combustor 17. However, in some embodiments, the axial centerline 352 of the boss 300 may be slanted or angled with respect to the axial direction A of the combustor 17.

As shown in FIGS. 8 and 9, the flange portion 304 may extend generally axially and circumferentially, and the annular wall portion 306 may extend generally radially from the flange portion 304 (i.e., generally perpendicular from the flange portion 304. The flange portion 304 may be fixedly coupled (e.g., via the annular weld joint 302) to the combustion liner 46 (FIGS. 4 and 5). The flange portion 304 may extend outwardly from the annular wall portion 306 to an annular edge 310. The annular edge 310 may be the terminal end of the flange portion 304. The annular edge 310 may be welded to the combustion liner 46 (e.g., via the annular weld joint 302).

The annular wall portion 306 may extend generally radially from a root 311 at an intersection with the flange portion 304 to a terminal end 313. In many embodiments, as shown in FIGS. 8 and 9, the annular wall portion 306 may include a first end segment 316, a second end segment 318 spaced apart from the first end segment 316, and side segments 320 extending between the first end segment 316 and the second end segment 318. The side segments 320 may extend generally axially between the first end segment 316 and the second end segment 318 with respect to the axial centerline 352. The first end segment 316 and the second end segment 318 may be generally arcuate, rounded, or otherwise curved and extend between the side segments 320. In exemplary embodiments, as shown in FIGS. 8 and 9, the boss 300 may further include a first blocking flange 322 extending from the first end segment 316 and a second blocking flange 324 extending from the second end segment 318. The first blocking flange 322 and the second blocking flange 324 may each extend away from the interior surface 314 and the opening 301 of the boss 300.

For example, the first blocking flange 322 may extend from the first end segment 316 in a direction generally perpendicular to the side segments 320. Similarly, the second blocking flange 324 may extend from the second end segment 318 generally perpendicularly to the side segments 320. Stated otherwise, the first blocking flange 322 and the second blocking flange 324 may extend in the transverse direction T beyond the side segments 320 and in the axial direction A beyond the respective end segments 316, 318. As discussed above, the transverse direction T may be tangential to the circumferential direction C and perpendicular to the center axis 350.

The first blocking flange 322 and the second blocking flange 324 may each include a first overhang portion 326, a mid-body portion 328, and a second overhang portion 330. The mid-body portion 328 of the first blocking flange 322 may be coupled to the first end segment 316, and the mid-body portion 328 of the second blocking flange 324 may be coupled to the second end segment 318. The mid-body portions 328 may extend axially outwardly from the respective end segments 316, 318 to which they are attached. The first overhang portion 326 may extend transversely (i.e., in the transverse direction) from a first side of the mid-body portion 328, and the second overhang portion 330 may extend transversely from a second side of the mid-body portion 328 opposite the first side. The first overhang portion 326 may be longer than the second overhang portion 330 in the transverse direction T. The first overhang portion 326 may extend transversely from the mid-body portion 328 beyond the side segment 320 and the annular edge 310 of flange portion 304. The second overhang portion 330 may extend transversely from the mid-body portion 328 beyond the side segment 320. In exemplary embodiments, the first overhang portion 326 may define a hole 332 through which a fastener (such as a threaded fastener) may extend to couple the boss 300 to one or more components of the fuel injection assembly 80 (such as the insert 500, the fuel injector 200, and/or the debris filter 400) and/or one or more components of the combustor 17 (such as the combustion liner 46 and/or the outer sleeve 48).

In operation, the blocking flanges 322, 324 may advantageously prevent air from the annulus 47 from flowing over the end segments 316, 318 of the annular wall portion 306 into the mixing channel 312. For example, it is advantageous for all the air from the annulus 47 to enter the mixing channel 312 circumferentially (e.g., over the side segments 320) rather than axially to increase mixedness of the fuel/air and to prevent flow separation and/or flame holding issues.

In many embodiments, the boss 300 may include an interior surface 314 that defines an opening 301. The opening 301 may be generally shaped as a geometric stadium (e.g., a rectangle having two circular ends). Referring back to FIGS. 4 and 5 briefly, the insert 500 may be positioned within the opening 301, and the insert 500 may define the mixing channel 312 (which may also be shaped as a geometric stadium). The insert 500 may be directly exposed to high temperature fuel/air within the mixing channel 312, and the boss 300 may be exposed to the combustion gases within the combustion chamber 70 because the flange portion 304 of the boss 300 partially defines the combustion chamber 70. As such, it is important that both the insert 500 and the boss 300 be robust to high temperatures. The boss 300 shown and described herein advantageously includes a plurality of serpentine cooling passages 340 that function to cool both the boss 300 and the insert 500, thereby increasing the hardware life of these components as well as the efficiency of the overall combustor 17.

Figure 10:
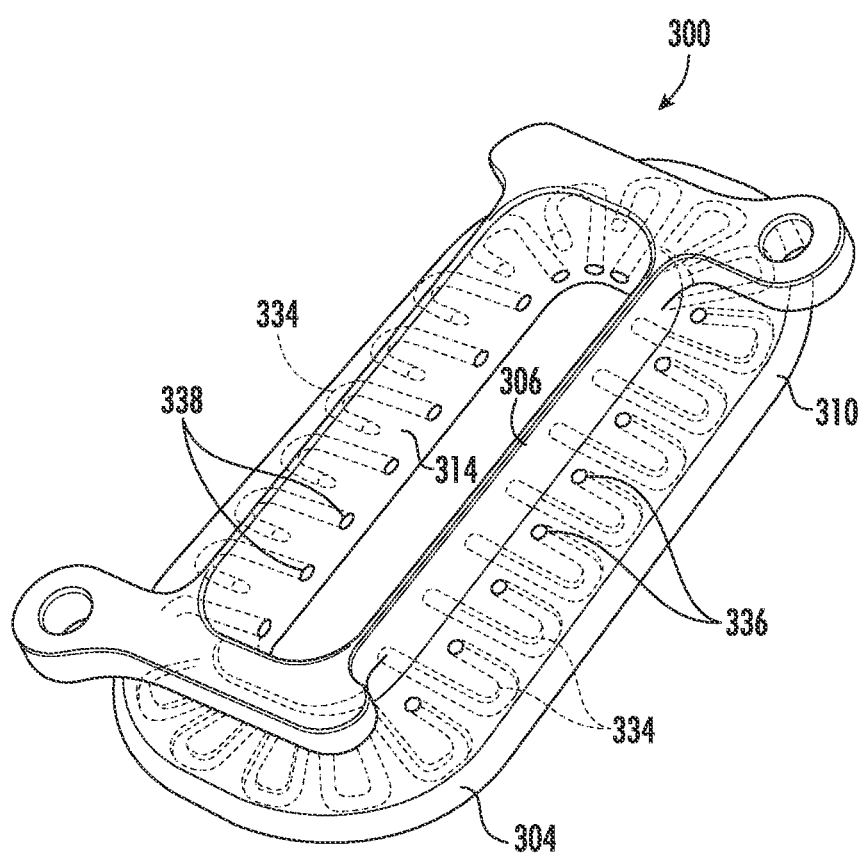
FIG. 10 illustrates a perspective view of the boss of a fuel injection assembly of FIG. 8, in accordance with embodiments of the present disclosure.

FIG. 10 illustrates a perspective view of the boss 300 of the fuel injection assembly 80, in accordance with embodiments of the present disclosure. As shown, the boss 300 may define a serpentine or winding cooling passage 334 (shown in phantom lines) that extends from an inlet 336 on the flange portion 304 to an outlet 338 on the interior surface 314. Particularly, the boss 300 may define a plurality of serpentine cooling passages 334 each extending from a respective inlet 336 on the flange portion 304 to a respective outlet 338 on the interior surface 314. The inlet 336 of each serpentine cooling passage 334 may be disposed on the flange portion 304 closer to the annular wall portion 306 than the annular edge 310. Particularly, the inlet 336 of each serpentine cooling passage 334 may be defined on the radially outer surface 305 proximate the annular wall portion 306 (i.e., closer to the annular wall portion 306 than the annular edge 310). The plurality of serpentine cooling passages 334 may be spaced apart from one another. For example, the plurality of serpentine cooling passages 334 may be spaced apart (e.g., equally spaced apart) about the opening 301 to provide cooling across a large area of the flange portion 304.

Figure 11:
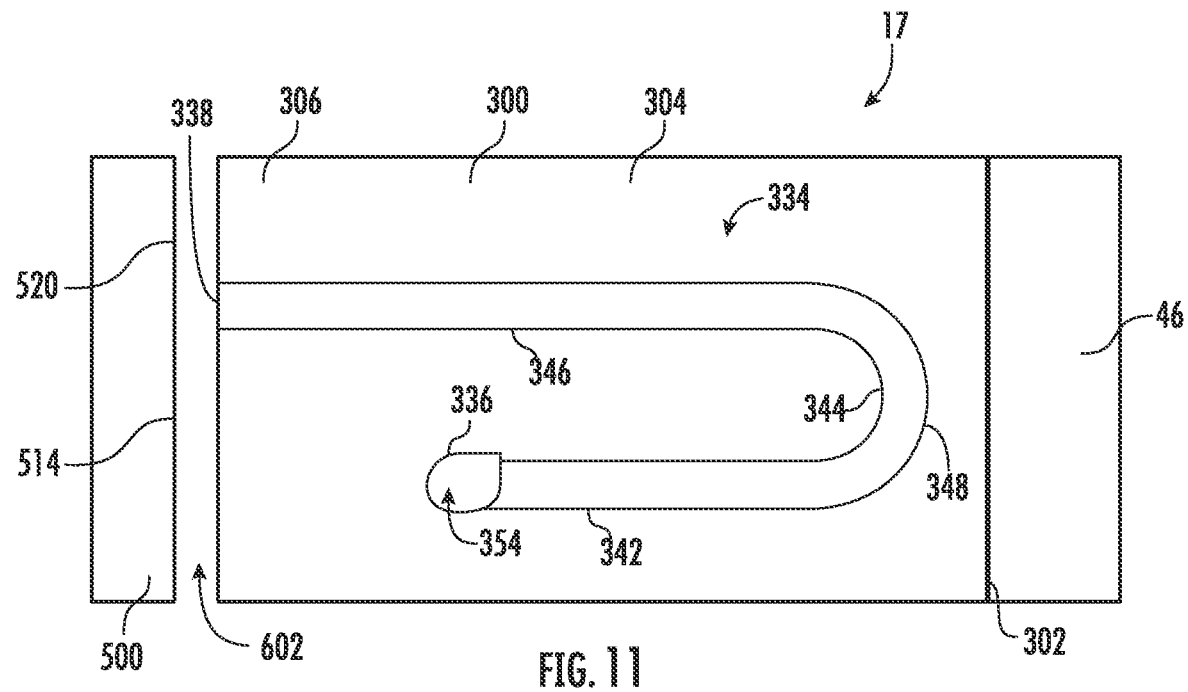
FIG. 11 illustrates a cross-sectional enlarged view of a portion of the boss of FIGS. 8-10 coupled to a combustion liner, in which the boss defines a first serpentine cooling passage, in accordance with embodiments of the present disclosure.
Figure 12:
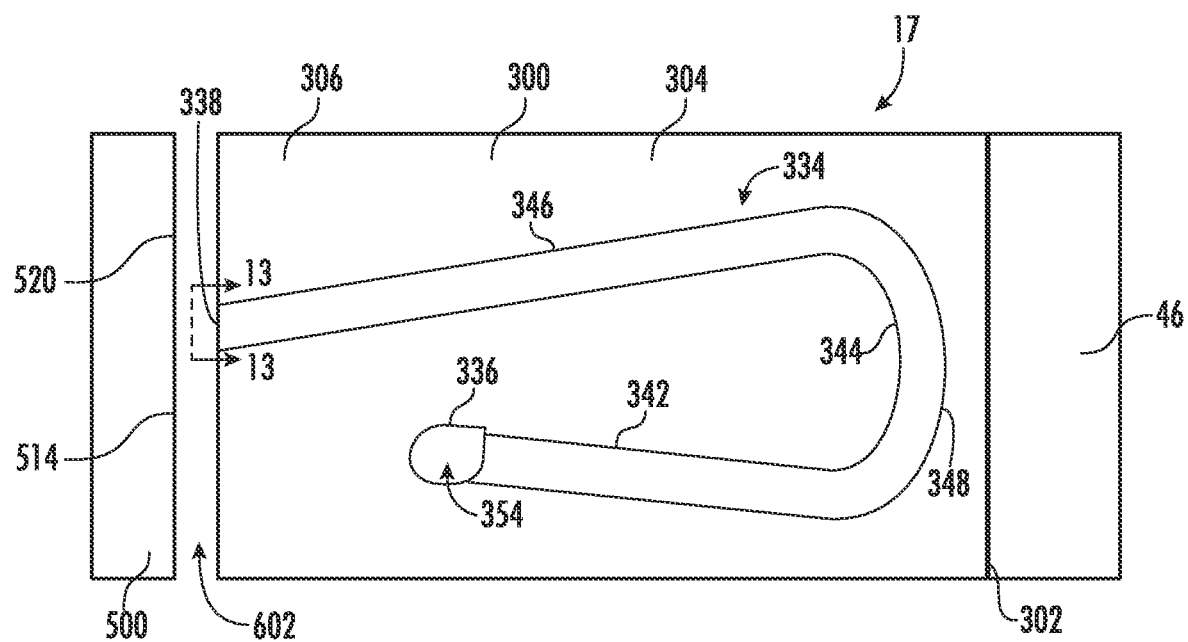
FIG. 12 illustrates a cross-sectional enlarged view of a portion of the boss of FIGS. 8-10 coupled to a combustion liner, in which the boss defines a second serpentine cooling passage, in accordance with embodiments of the present disclosure.

FIGS. 11 and 12 each illustrate a cross-sectional enlarged view of a combustor 17 having the boss 300 coupled to the combustion liner 46 and a serpentine cooling passage 334 in accordance with embodiments of the present disclosure. As discussed above, the flange portion 304 of the boss 300 may extend to an annular edge 310, and the annular edge 310 may be fixedly coupled to the combustion liner 46 (e.g., via an annular weld joint 302). The boss 300 may include an interior surface 314 that is spaced apart from the insert 500 such that a cooling gap 602 is defined between the boss 300 and the insert 500. Particularly, the cooling gap 602 may be defined between a side wall 506 of the insert and the interior surface 314 of the boss 300. Referring back to FIG. 5 briefly, as shown, the cooling gap 602 extends radially outward from the outlet 338 towards the terminal end 313 of the boss 300. Additionally, the cooling gap 602 may extend radially inwardly from the outlet 338 to a film cooling outlet 604. The film cooling outlet 604 may provide film cooling air to the base 508 of the insert 500 during operation of the fuel injection assembly 80 before spreading along the radially inner surface 309 of the flange portion 304.

In exemplary embodiments, the serpentine cooling passage 334 may extend from the inlet 336, which is fluidly coupled to a low pressure air source (such as the annulus 47), to the outlet 338, which is fluidly coupled to the cooling gap 602. The inlet 336 may be disposed on the flange portion 304 of the boss 300, and the outlet 338 may be disposed on the interior surface 314 facing the side wall 506. In exemplary implementations, the outlet 338 of the serpentine cooling passage 334 may direct air to impinge upon the insert 500 (e.g., the air exiting the outlet 338 may travel across the cooling gap 602 and strike the insert 500). Subsequently, the air within the cooling gap 602 may exit the film cooling outlet 604.

In many embodiments, the serpentine cooling passage 334 may include an inlet portion 342, a U-shaped portion 344, and an outlet portion 346. The inlet portion 342 may extend from the inlet 336 towards the annular edge 310 (with welded joint 302), and the outlet portion 346 may extend away from the annular edge 310 to the outlet 338. Particularly, the inlet portion 342 may extend from the inlet 336 to the U-shaped portion 344, and the outlet portion 346 may extend from the U-shaped portion 344 to the outlet 338. The U-shaped portion 344 may fluidly connect the inlet portion 342 to the outlet portion 346. For example, the U-shaped portion 344 may extend from the inlet portion 342, towards the annular edge 310, to an apex 348. Further, the U-shaped portion 344 may extend from the apex 348, away from the annular edge 310, to the outlet portion 346.

In some embodiments, as shown in FIG. 11, the inlet portion 342 may be generally parallel to the outlet portion 346. In other embodiments, the inlet portion 342 and the outlet portion 346 may be angled, slanted, or sloped relative to one another. For example, as shown in FIG. 12, the inlet portion 342 may diverge away from the outlet portion 346 as the inlet portion 342 extends from the inlet 336 to towards the annular edge 310. Additionally, the outlet portion 346 may converge towards the inlet portion 342 as the outlet portion 346 extends away from the annular edge 310 towards the outlet 338. In some embodiments, the plurality of serpentine cooling passages 334 may include serpentine cooling passages 334 having parallel inlet portions 342 and outlet portions 346 (as in FIG. 11) along the sides of the boss 300 and serpentine cooling passages 334 having non-parallel inlet portions 342 and outlet portions 346 (as in FIG. 12) along the ends of the boss 300.

Figure 13:
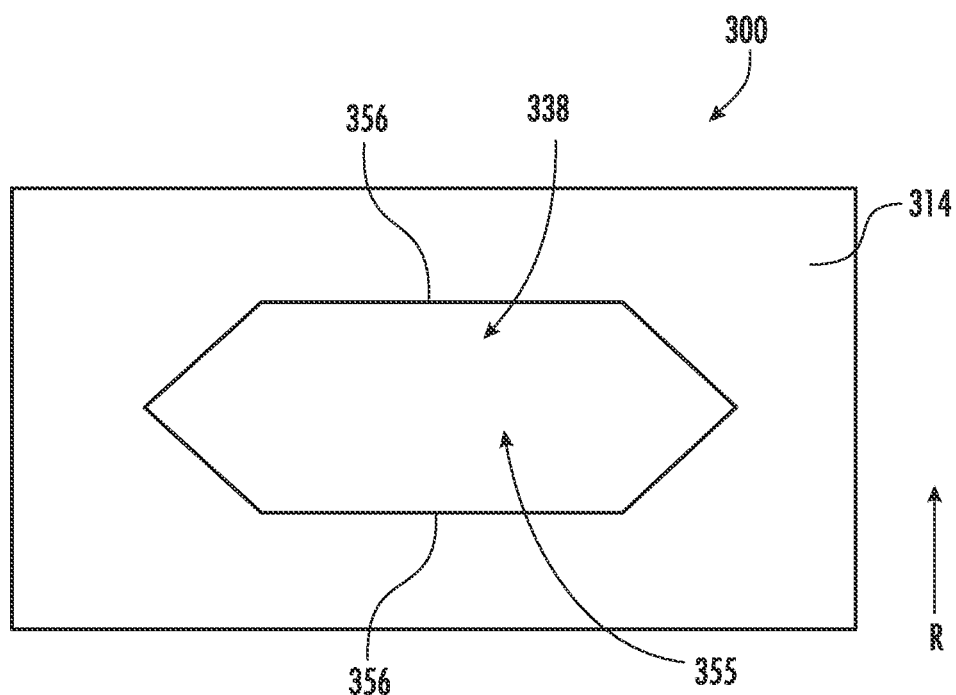
FIG. 13 illustrates an enlarged planar view of the boss from along the line 13-13 shown in FIG. 12, in accordance with embodiments of the present disclosure.

In various embodiments, at least one of the inlet 336 and/or the outlet 338 of the serpentine cooling passage 334 may have a non-circular shape, which may advantageously increase the cooling effectiveness of the serpentine cooling passage 334 as well as facilitate the additive manufacturing of the boss 300. In exemplary embodiments, the inlet 336 and the outlet 338 may each have different non-circular shapes. For example, the inlet 336 may have a first non-circular shape (such as a teardrop shape) and the outlet 338 may have a second non-circular shape (such as a hexagon) that is different than the first non-circular shape. As shown in FIGS. 11 and 12, in exemplary embodiments, the inlet 336 may have a teardrop shape 354. However, in other embodiments (not shown), the inlet 336 may have a polygonal shape or other suitable shape, which may or may not be symmetrical. Referring now to FIG. 13, an enlarged planar view of the boss 300 from along the line 13-13 shown in FIG. 12 is illustrated in accordance with embodiments of the present disclosure. As shown, the outlet 338 may have a polygonal shape 355. That is, the outlet 338 may have a hexagonal shape with two parallel sides 356 being longer than all other sides. The two parallel sides 356 may be perpendicular to the radial direction R in many embodiments.

In many embodiments, the boss 300, the fuel injector 200, the insert 500, and/or the debris filter 400 described herein may each be integrally formed as a single component. That is, the boss 300, the fuel injector 200, the insert 500, and/or the debris filter 400 may each be manufactured as a single body or object that is free of an internal weld joint, an internal brazed joint, an internal adhered joint, or a combination thereof. In exemplary implementations, this may be done by utilizing an additive manufacturing system and method, such as direct metal laser sintering (DMLS), direct metal laser melting (DMLM), or other suitable additive manufacturing techniques. In other embodiments, other manufacturing techniques, such as casting or other suitable techniques, may be used. In some instances, the boss 300 and the insert 500 may be constructed as a single body or object.

Further, by utilizing additive manufacturing methods, the boss 300, the fuel injector 200, the insert 500, and/or the debris filter 400 may each be integrally formed as a single piece of continuous metal and may thus include fewer sub-components and/or joints compared to prior designs. The integral formation of each of the boss 300, the fuel injector 200, the insert 500, and/or the debris filter 400 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A fuel injection assembly for a combustor of a gas turbine, the fuel injection assembly comprising: a fuel injector configured to couple to an outer sleeve of the combustor; and a boss spaced apart from the fuel injector and configured to couple to a combustion liner of the combustor, the boss comprising a flange portion, an annular wall portion extending from the flange portion, and an interior surface, the boss defining a serpentine cooling passage extending from an inlet on the flange portion to an outlet on the interior surface.

The fuel injection assembly as in any preceding clause, further comprising an insert coupled to the boss such that a cooling gap is defined between the boss and the insert.

The fuel injection assembly as in any preceding clause, wherein the inlet of serpentine cooling passage is fluidly coupled to a low pressure air source, and wherein the outlet of serpentine cooling passage is fluidly coupled to the cooling gap.

The fuel injection assembly as in any preceding clause, wherein the flange portion of the boss extends to an annular edge.

The fuel injection assembly as in any preceding clause, wherein the serpentine passage includes an inlet portion, an outlet portion, and a U-shaped portion fluidly connecting the inlet portion and the outlet portion, wherein the inlet portion extends from the inlet towards the annular edge, and the outlet portion extends away from the annular edge to the outlet.

The fuel injection assembly as in any preceding clause, wherein the inlet portion is generally parallel to the outlet portion.

The fuel injection assembly as in any preceding clause, wherein the inlet portion diverges away from the outlet portion as the inlet portion extends from the inlet to towards the annular edge, and wherein the outlet portion converges towards the inlet portion as the outlet portion extends away from the annular edge towards the outlet.

The fuel injection assembly as in any preceding clause, wherein the flange portion of the boss includes a radially outer surface, and wherein the inlet of the serpentine cooling passage is defined on the radially outer surface proximate the annular wall portion.

The fuel injection assembly as in any preceding clause, wherein at least one of the inlet or the outlet of the serpentine cooling channel has a non-circular shape.

The fuel injection assembly as in any preceding clause, wherein the serpentine cooling passage is a first serpentine cooling passage in a plurality of serpentine cooling passages defined in the boss, the plurality of serpentine cooling passages being spaced apart from one another.

The fuel injection assembly as in any preceding clause, wherein the annular wall portion includes a first end segment, a second end segment, and side segments extending between the first end segment and the second end segment, and wherein the boss comprises a first blocking flange extending from the first end segment and a second blocking flange extending from the second end segment.

A combustor comprising: at least one fuel nozzle; a combustion liner extending downstream from the fuel nozzle; an outer sleeve spaced apart from and surrounding the combustion liner such that an annulus is defined therebetween; and a fuel injection assembly disposed downstream from the at least one fuel nozzle, the fuel injection assembly comprising: a fuel injector coupled to the outer sleeve of the combustor; and a boss spaced apart from the fuel injector and coupled to the combustion liner of the combustor, the boss comprising a flange portion, an annular wall portion extending from the flange portion, and an interior surface, the boss defining a serpentine cooling passage extending from an inlet on the flange portion to an outlet on the interior surface.

The combustor as in any preceding clause, further comprising an insert coupled to the boss such that a cooling gap is defined between the boss and the insert.

The combustor as in any preceding clause, wherein the inlet of serpentine cooling passage is fluidly coupled to a low pressure air source, and wherein the outlet of serpentine cooling passage is fluidly coupled to the cooling gap.

The combustor as in any preceding clause, wherein the flange portion of the boss extends to an annular edge.

The combustor as in any preceding clause, wherein the serpentine passage includes an inlet portion, an outlet portion, and a U-shaped portion fluidly connecting the inlet portion and the outlet portion; and wherein the inlet portion extends from the inlet towards the annular edge, and the outlet portion extends away from the annular edge to the outlet.

The combustor as in any preceding clause, wherein the serpentine cooling passage is a first serpentine cooling passage in a plurality of serpentine cooling passages defined in the boss, the plurality of serpentine cooling passages being spaced apart from one another; wherein the inlet portion of the first serpentine cooling passage is generally parallel to the outlet portion of the first serpentine cooling passage; wherein the plurality of serpentine cooling passages includes a second serpentine cooling passage having a second inlet portion and a second outlet portion; and wherein the second inlet portion diverges away from the second outlet portion as the second inlet portion extends towards the annular edge, and the second outlet portion converges towards the second inlet portion as the second outlet portion extends away from the annular edge.

The combustor as in any preceding clause, wherein the annular wall portion includes a first end segment, a second end segment, and side segments extending between the first end segment and the second end segment, and wherein the boss comprises a first blocking flange extending from the first end segment and a second blocking flange extending from the second end segment.

A fuel injection assembly for a combustor of a gas turbine, the fuel injection assembly comprising: a fuel injector configured to couple to an outer sleeve of the combustor; and a boss spaced apart from the fuel injector and configured to couple to a combustion liner of the combustor, the boss comprising a flange portion and an annular wall portion extending from the flange portion, wherein the annular wall portion includes a first end segment, a second end segment, and side segments extending between the first end segment and the second end segment, and wherein the boss comprises a first blocking flange extending from the first end segment and a second blocking flange extending from the second end segment.

The fuel injection assembly of any preceding clause, wherein the flange portion of the boss comprises a plurality of serpentine cooling passages, each serpentine cooling passage having an inlet disposed proximate to the annular wall portion and an outlet defined in an interior surface of the annular wall portion; wherein the inlet is fluidly coupled to an inlet portion, the outlet is fluidly coupled to an outlet portion, and the inlet portion and the outlet portion are fluidly coupled by a U-shaped portion. A fuel injection assembly for a combustor of a gas turbine, the fuel injection assembly comprising: a boss forming at least a portion of an annular wall, the annular wall defining a mixing channel that extends along a center axis; and a fuel injector having a radially outer wall and a radially inner wall that at least partially define a fuel plenum, a plurality of premix tubes each extending along an injection axis from an inlet end on the radially outer wall through the fuel plenum to an outlet end, and wherein the injection axis is slanted towards the center axis of the mixing channel.

The fuel injection assembly as in any preceding clause, wherein at least one premix tube of the plurality of premix tubes defines a non-circularly shaped opening.

The fuel injection assembly as in any preceding clause, wherein at least one premix tube of the plurality of premix tubes defines an elliptical shaped opening.

The fuel injection assembly as in any preceding clause, wherein the plurality of premix tubes is fluidly coupled to a high pressure air source, and wherein the mixing channel is fluidly coupled to a low pressure air source.

The fuel injection assembly as in any preceding clause, wherein the plurality of premix tubes is arranged in a plurality of rows.

The fuel injection assembly as in any preceding clause, wherein the plurality of rows includes a first outer row, a first inner row, a second inner row, and a second outer row.

The fuel injection assembly as in any preceding clause, wherein a sloped support extends from the radially inner wall, the sloped support coupled to one or more premix tubes of the plurality of premix tubes.

The fuel injection assembly as in any preceding clause, wherein each row of premix tubes is axially offset relative to a neighboring row of premix tubes.

The fuel injection assembly as in any preceding clause, wherein the boss comprises a flange portion and an annular wall portion extending from the flange portion, and wherein the flange portion is configured to couple to a combustion liner of the combustor.

The fuel injection assembly as in any preceding clause, further comprising an insert coupled to the annular wall portion of the boss, wherein the insert and the annular wall portion collectively form the annular wall.

The fuel injection assembly as in any preceding clause, further comprising a debris filter coupled to the fuel injector.

A combustor comprising: at least one fuel nozzle; a combustion liner extending downstream from the fuel nozzle; an outer sleeve spaced apart from and surrounding the combustion liner such that an annulus is defined therebetween; and a fuel injection assembly disposed downstream from the at least one fuel nozzle, the fuel injection assembly comprising: a boss coupled to the combustion liner, the boss forming at least a portion of an annular wall, the annular wall defining a mixing channel that extends along a center axis; and a fuel injector coupled to the outer sleeve radially outward of the boss, the fuel injector having a radially outer wall and a radially inner wall that at least partially define a fuel plenum, a plurality of premix tubes each extending along an injection axis from an inlet end on the radially outer wall through the fuel plenum and the radially inner wall to an outlet end, and wherein the injection axis is slanted towards the center axis of the mixing channel.

The combustor as in any preceding clause, wherein at least one premix tube of the plurality of premix tubes defines a non-circularly shaped opening.

The combustor as in any preceding clause, wherein at least one premix tube of the plurality of premix tubes defines an elliptical shaped opening.

The combustor as in any preceding clause, wherein the plurality of premix tubes is fluidly coupled to a high pressure air source, and wherein the mixing channel is fluidly coupled to a low pressure air source, the low pressure air source being the annulus between the combustion liner and the outer sleeve.

The combustor as in any preceding clause, wherein the plurality of premix tubes is arranged in a plurality of rows.

The combustor as in any preceding clause, wherein the plurality of rows includes a first outer row, a first inner row, a second inner row, and a second outer row.

The combustor as in any preceding clause, wherein a sloped support extends from the radially inner wall, the sloped support coupled to one or more premix tubes of the plurality of premix tubes.

The combustor as in any preceding clause, wherein each row of premix tubes is axially offset relative to a neighboring row of premix tubes.

The combustor as in any preceding clause, wherein the boss comprises a flange portion and an annular wall portion extending from the flange portion, and wherein the flange portion is coupled to the combustion liner of the combustor.

What is claimed is:
1. A fuel injection assembly for a combustor of a gas turbine, the fuel injection assembly comprising:

a fuel injector configured to couple to an outer sleeve of the combustor; and a boss configured to couple to a combustion liner of the combustor, the boss comprising a flange portion extending to an annular edge, an annular wall portion extending from the flange portion, and an interior surface, the boss defining a serpentine cooling passage extending from an inlet on the flange portion to an outlet on the interior surface, the serpentine cooling passage including an inlet portion and an outlet portion, wherein the inlet portion diverges away from the outlet portion as the inlet portion extends from the inlet towards the annular edge, and wherein the outlet portion converges towards the inlet portion as the outlet portion extends away from the annular edge towards the outlet.

2. The fuel injection assembly as in claim 1, further comprising an insert coupled to the boss such that a cooling gap is defined between the boss and the insert.

3. The fuel injection assembly as in claim 2, wherein the inlet of the serpentine cooling passage is fluidly coupled to a low pressure air source, and wherein the outlet of the serpentine cooling passage is fluidly coupled to the cooling gap.

4. The fuel injection assembly as in claim 1, wherein the serpentine cooling passage includes the inlet portion, the outlet portion, and a C-shaped portion fluidly connecting the inlet portion and the outlet portion, wherein the C-shaped portion is spaced apart from the annular edge, wherein the inlet portion extends from the inlet towards the annular edge, and the outlet portion extends away from the annular edge to the outlet.

5. The fuel injection assembly as in claim 1, wherein the flange portion of the boss includes a radially outer surface, and wherein the inlet of the serpentine cooling passage is defined on the radially outer surface proximate the annular wall portion.

6. The fuel injection assembly as in claim 1, wherein the serpentine cooling passage is a first serpentine cooling passage in a plurality of serpentine cooling passages defined in the boss, the plurality of serpentine cooling passages being spaced apart from one another.

7. The fuel injection assembly as in claim 1, wherein the annular wall portion includes a first end segment, a second end segment, and side segments extending between the first end segment and the second end segment, and wherein the boss comprises a first blocking flange extending from the first end segment and a second blocking flange extending from the second end segment.

8. The fuel injection assembly as in claim 1, wherein the inlet and the outlet have different non-circular shapes.

9. A combustor comprising:
at least one fuel nozzle;
a combustion liner extending downstream from the at least one fuel nozzle;
an outer sleeve spaced apart from and surrounding the combustion liner such that an annulus is defined therebetween; and
a fuel injection assembly disposed downstream from the at least one fuel nozzle, the fuel injection assembly comprising:
  a fuel injector coupled to the outer sleeve of the combustor; and
  a boss coupled to the combustion liner of the combustor, the boss comprising a flange portion extending to an annular edge, an annular wall portion extending from the flange portion, and an interior surface, the boss defining a serpentine cooling passage extending from an inlet on the flange portion to an outlet on the interior surface, the serpentine cooling passage including an inlet portion and an outlet portion, wherein the inlet portion diverges away from the outlet portion as the inlet portion extends from the inlet towards the annular edge, and wherein the outlet portion converges towards the inlet portion as the outlet portion extends away from the annular edge towards the outlet.

10. The combustor as in claim 9, further comprising an insert coupled to the boss such that a cooling gap is defined between the boss and the insert.

11. The combustor as in claim 10, wherein the inlet of the serpentine cooling passage is fluidly coupled to a low pressure air source, and wherein the outlet of the serpentine cooling passage is fluidly coupled to the cooling gap.

12. The combustor as in claim 9, wherein the serpentine cooling passage includes the inlet portion, the outlet portion, and a C-shaped portion fluidly connecting the inlet portion and the outlet portion; and wherein the inlet portion extends from the inlet towards the annular edge, and the outlet portion extends away from the annular edge to the outlet.

13. The combustor as in claim 12, wherein the serpentine cooling passage is a first serpentine cooling passage in a plurality of serpentine cooling passages defined in the boss, the plurality of serpentine cooling passages being spaced apart from one another; wherein the plurality of serpentine cooling passages includes a second serpentine cooling passage having a second inlet portion and a second outlet portion; and wherein the second inlet portion is generally parallel to the second outlet portion.

14. The combustor as in claim 9, wherein the annular wall portion includes a first end segment, a second end segment, and side segments extending between the first end segment and the second end segment, and wherein the boss comprises a first blocking flange extending from the first end segment and a second blocking flange extending from the second end segment.

15. A fuel injection assembly for a combustor of a gas turbine, the fuel injection assembly comprising:
a fuel injector configured to couple to an outer sleeve of the combustor; and
a boss spaced apart from the fuel injector and configured to couple to a combustion liner of the combustor, the boss comprising a flange portion, an annular wall portion extending from the flange portion, and an interior surface, the boss defining a serpentine cooling passage extending from an inlet on the flange portion to an outlet on the interior surface, wherein the flange portion of the boss extends to an annular edge, wherein the serpentine cooling passage includes an inlet portion, an outlet portion, and a C-shaped portion fluidly connecting the inlet portion and the outlet portion, wherein the inlet portion extends from the inlet towards the annular edge, and the outlet portion extends away from the annular edge to the outlet, wherein the inlet portion diverges away from the outlet portion as the inlet portion extends from the inlet towards the annular edge, and wherein the outlet portion converges towards the inlet portion as the outlet portion extends away from the annular edge towards the outlet.

* * * * *